(12) United States Patent
Smith et al.

(10) Patent No.: US 12,345,487 B2
(45) Date of Patent: Jul. 1, 2025

(54) PAYLOAD PLATFORM ACCOUNTABILITY CONTROL SYSTEM

(71) Applicant: Axon Enterprise, Inc., Scottsdale, AZ (US)

(72) Inventors: Patrick W. Smith, Scottsdale, AZ (US); Karl U. Schultz, Phoenix, AZ (US); Jenner B. Holden, Phoenix, AZ (US); Austin S. Appel, Gilbert, AZ (US); Justin K. Powley, Scottsdale, AZ (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 0 days.

(21) Appl. No.: 18/273,676

(22) PCT Filed: Feb. 4, 2022

(86) PCT No.: PCT/US2022/015264
§ 371 (c)(1),
(2) Date: Jul. 21, 2023

(87) PCT Pub. No.: WO2022/177759
PCT Pub. Date: Aug. 25, 2022

(65) Prior Publication Data
US 2024/0151484 A1 May 9, 2024

Related U.S. Application Data

(60) Provisional application No. 63/145,862, filed on Feb. 4, 2021.

(51) Int. Cl.
*F41A 17/06* (2006.01)
*F41H 13/00* (2006.01)

(52) U.S. Cl.
CPC ........ *F41A 17/066* (2013.01); *F41H 13/0012* (2013.01)

(58) Field of Classification Search
CPC ..... F41A 17/06; F41A 17/066; F41H 13/0012
USPC ...................................... 42/70.01
See application file for complete search history.

(56) References Cited

U.S. PATENT DOCUMENTS

| | | | |
|---|---|---|---|
| 11,326,847 B1 * | 5/2022 | Bango | ............... F41A 17/063 |
| 2012/0214137 A1 | 8/2012 | Goree et al. | |
| 2015/0332528 A1 | 11/2015 | McGinnis et al. | |
| 2017/0010062 A1 | 1/2017 | Black et al. | |

(Continued)

OTHER PUBLICATIONS

Korean Intellectual Propoerty Office, International Search Report for International Application No. PCT/US2022/015264 mailed Oct. 20, 2022.

*Primary Examiner* — Bret Hayes
(74) *Attorney, Agent, or Firm* — Justin Powley

(57) ABSTRACT

An accountability control system may be configured to provide one or more accountability controls to a payload platform. A payload platform may comprise a device configured to deploy a payload. The accountability controls may comprise one or more of an authentication control, an authorization control, a custody control, or a security analysis control. The accountability controls may restrict or disable access and operations of the payload platform. The accountability controls may also create a chain of custody of operations and events taking place in the accountability control system and the payload platform.

20 Claims, 13 Drawing Sheets

(56) References Cited

U.S. PATENT DOCUMENTS

| | | |
|---|---|---|
| 2017/0103643 A1* | 4/2017 | Powers, III ............... E05G 1/00 |
| 2018/0268119 A1 | 9/2018 | Nicoll |
| 2019/0376755 A1 | 12/2019 | Teetzel et al. |
| 2020/0109905 A1* | 4/2020 | Black ................. G08B 13/2448 |
| 2020/0370851 A1* | 11/2020 | Shahbaz ................. F41A 17/56 |
| 2023/0168056 A1* | 6/2023 | Galie ..................... F41A 17/06 |
| | | 42/69.03 |

* cited by examiner

PAYLOAD PLATFORM ACCOUNTABILITY CONTROL SYSTEM

FIELD

Embodiments of the present disclosure relate to an accountability control system for a payload platform.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
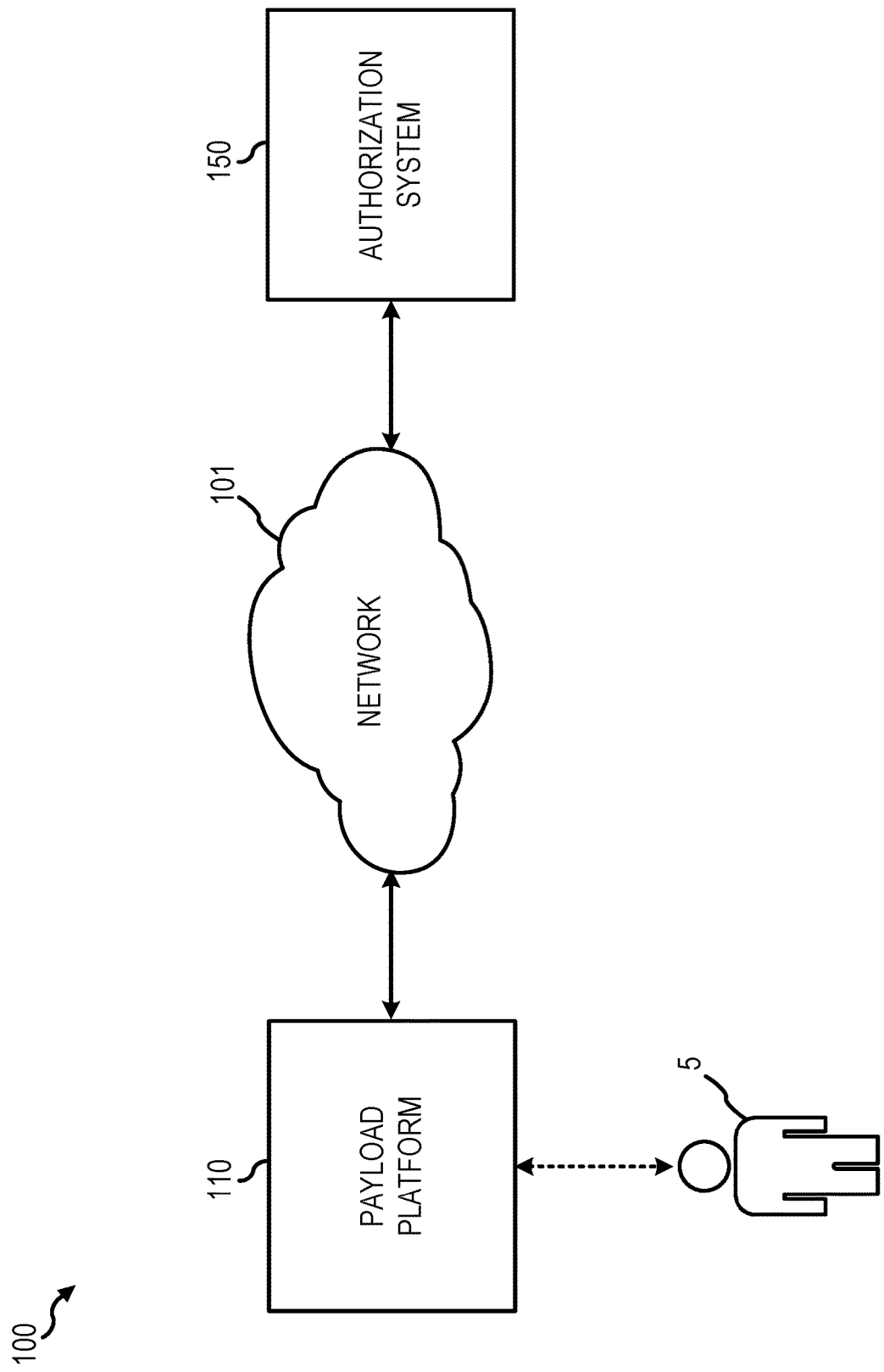
FIG. 1 is a block diagram illustrating system components of an accountability control system, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, accountability control systems and methods for a payload platform are disclosed (collectively, an "accountability control system"). As discussed herein, a "payload platform" may include any platform, device, or system configured to deploy (or cause deployment of) a payload. For example, a payload platform may comprise one or more electronic devices configured to deploy a payload.

In various embodiments, a payload platform may comprise a platform, device, or system configured to deploy a less-lethal or non-lethal projectile such as, for example, a conducted electrical weapon (CEW), a modular conducted electrical weapon (MCEW), a payload launcher, a projectile device configured to deploy entangling projectiles, and/or the like. In that regard, the payload platform may comprise a standalone device, a device mounted or in communication with a second device, or a platform, device, or system configured to deploy a less-lethal or non-lethal projectile in electronic communication with a second electronic device, as discussed further herein.

In various embodiments, a payload platform may comprise a platform, device, or system configured to deploy a lethal projectile such as, for example, a firearm (e.g., a rifle, a handgun, a shotgun, etc.). In that regard, the payload platform may comprise a firearm controlled by or in communication with an electronic device. The electronic device may be configured to provide accountability controls to the firearm and/or enable electronic communications, as discussed further herein.

As a further example, a payload platform may comprise a platform and a separate payload launcher configured to deploy a payload. The separate payload launcher may be mounted to or proximate the platform. The separate payload launcher may also be in electronic communication with the platform.

In various embodiments, a payload platform may comprise a remote vehicle with a mounted payload launcher. The remote vehicle may comprise any object capable of traveling by land (e.g., surfaces), water, or air. The remote vehicle may be operated by a human user. The remote vehicle may comprise an autonomous vehicle. The remote vehicle may comprise an unmanned aerial vehicle (UAV) (e.g., a drone), an unmanned ground vehicle (UGV), an unmanned surface vessel (USV) (e.g., unmanned surface vehicle, autonomous surface vehicle, etc.), a robot, a car, or the like. A ground vehicle may comprise one or more wheels, a continuous track (e.g., tank tread, caterpillar track, etc.), or the like configured to enable movement of the vehicle on land-based terrain. The remote vehicle may be operable via a platform bay and/or a separate control interface. The remote vehicle may be operable via a short-range electronic communication and/or via a long-range electronic communication.

In various embodiments, the decision to remotely deploy a payload from a platform may be received directly from a human operator.

In various embodiments, a payload platform may comprise a static structure such as a security pole, a building wall (internal or external), a wall or surface of an access control vestibule (e.g., an air lock, a mantrap, a sally port, etc.), a surface of a vehicle, a surface or exterior surface of an electronic device (e.g., a recording device, a CCTV camera, etc.), or the like (e.g., the platform). The payload platform may further comprise a payload launcher mounted to the static structure.

As discussed herein, a "payload" may include any object, projectile, or the like configured to be deployed from a payload platform. A "payload" may also include an object, unit, device, or the like configured to deploy any object, projectile, or the like responsive to instructions from a payload platform. For example, and in accordance with various embodiments, a payload may comprise a lethal projectile. In that regard, a payload may comprise a firearm ammunition such as a shell or metal bullet (e.g., rimfire ammunition, centerfire ammunition, shotshell ammunition, etc.), and/or any other lethal projectile. As a further example, and in accordance with various embodiments, a payload may comprise a non-lethal or less-lethal projectile. In that regard a payload may comprise or be configured to deploy a rubber projectile (e.g., a rubber bullet), a CEW electrode, a MCEW electrode or payload, an entangling projectile configured to entangle a target (e.g., a tether-based entangling projectile, a net, etc.), a scent-based projectile, pepper spray or a pepper spray projectile (e.g., oleoresin capsicum, OC spray), tear gas or tear gas cannisters or projectiles (e.g., 2-chlorobenzalmalononitrile, CS spray), and/or any other non-lethal or less-lethal projectile.

In various embodiments, an accountability control system may be configured to provide one or more accountability controls for a payload platform. The accountability controls may be configured to provide accountability to the operation and deployment of payload platforms. For example, the accountability controls may be configured to control access to and/or operation of the payload platform. The accountability controls may be configured to control access to, operation of, and/or deployment of projectiles or payloads from the payload platform. The accountability controls may be configured to generate a record of events of the payload platform.

In accordance with various embodiments, an accountability control may comprise an authentication control. The authentication control may comprise one or more controls configured to verify the identity of a user, a process, and/or a system or device. For example, the authentication control may correlate an authentication input (e.g., an authentication type) with one or more platform credentials assigned to a user. The authentication control may be implemented and configured using any suitable process or technique. In some embodiments, the structure of a payload platform may dictate authentication controls.

For example, the authentication control may comprise an authentication type. The authentication type may define the process for authenticating with the payload platform. The authentication type may define an authentication input needed from a user to grant the user access to one or more features or operations of a payload platform. The authentication type may define one or more of a physical authentication key, a virtual authentication key, a biometric authentication key, and/or any other suitable authentication key. In various embodiments, a payload platform may be configured to receive a single authentication type. In various embodiments, a payload platform may be configured (or required) to receive a plurality of authentication types (e.g., multi-factor authentication).

A physical authentication key may comprise a physical switch, lock, or the like configured to be opened or unlocked to access a payload platform. A physical authentication key may comprise a physical key configured to be inserted into a payload platform. For example, a physical key may be inserted into a lock of a payload platform and rotated to access the payload platform. As a further example, a physical key may be inserted into the payload platform and may communicate electronically with the payload platform. In other embodiments, a physical authentication key may comprise a physical or mechanical object configured to be removed from the payload platform. For example, the physical authentication key may comprise a plastic pin, a wire, a tab, or the like. Upon removal of the plastic pin, the wire, the tab, or the like, access may be granted to the payload platform.

A physical authentication key may comprise a hardware security key such as, for example, a security key, a security token, a universal authentication framework (UAF) key, a universal 2nd factor (U2F) key, a physical security key, and/or any other physical device offering hardware-based authentication. A hardware security key may be configured to communicate electronically with a payload platform via a hardware interface, a smart chip, a digital signal, an analog signal, or any other suitable electronic communication type. In that regard, a hardware security key may be configured to communicate electronically with a payload platform by one or more of universal serial bus (e.g., USB-A, USB-B, USB-C, Micro-USB, Mini-USB, etc.), a proprietary bus (e.g., Lightning™ created by Apple, Inc.), near-field communication (NFC), BLUETOOTH® (e.g., the BLUETOOTH® protocol maintained by Bluetooth Special Interest Group), and/or any other physical electronic communication or short-range wireless communication format or technology. In various embodiments, a hardware security key may further implement two-factor authentication, multi-factor authentication, and/or any other authentication protocol, schema, standard, or capability, including software-based authentication.

A virtual authentication key may comprise an authentication key virtually received by the payload platform. For example, a virtual authentication key may be input by a user via an input device of the payload platform. A virtual authentication key may comprise a code (e.g., one or more of an access code, a personal identification number ("PIN"), an internet code, other identification code, and/or the like), a password, a username and password, a number, a symbol, a digital certificate, a key from a public/private key pair, or any other identifier or indicia suitably configured to allow the user to be authenticated by the payload platform.

In various embodiments, an authentication key may be provided by and/or modified by a payload platform and/or a payload during an authentication. For example, in some embodiments, a payload platform or a payload may comprise or be coupled to an authentication key. To access the payload platform, a user may retrieve the authentication key from the payload platform or the payload, and insert the authentication key into the other of the payload platform or the payload. As a further example, a payload platform may comprise a first authentication key. To access the payload platform, a user may first input a different authentication key into the payload platform. In response to verifying or accepting the different authentication key, the payload platform may enable the user to retrieve the first authentication key (e.g., unlocking the first authentication key). The user may retrieve the first authentication key and insert the first authentication key into the payload. In some embodiments, in response to verifying or accepting the different authentication key, the payload platform may upload data (e.g., authentication data, payload platform data, a hash, a key, etc.) to the first authentication key. In that respect, in response to the user inserting the first authentication key into the payload, the payload may also verify or accept the uploaded data.

A biometric authentication key may include a biometric input from the user received by (or determined by) the payload platform. As used herein, a biometric input may include a user's voice, fingerprint, face, ear, signature, vascular patterns, DNA sampling, hand geometry, sound, olfactory, keystroke/typing, iris, retinal, or any other biometric relating to recognition based upon any body part, function, system, attribute, and/or other characteristic, or any portion thereof. In that regard, a payload platform may comprise a biometric security system configured to receive the biometric authentication key, as discussed further herein.

In various embodiments, a payload platform may control access based using a plurality of different authentication keys. For example, physical access to a payload platform may be controlled by a first authentication key. Access to operate or otherwise control payload platform may be controlled by a second authentication key. The first authentication key may be different from the second authentication key. For example, the first authentication key may be a physical authentication key or a biometric authentication key. The second authentication key may be a virtual authentication key.

The authentication type may be linked to one or more platform credentials (e.g., platform credentials stored in the accountability control system). The platform credentials may be assigned to a user during a platform enrollment process, as discussed further herein. In that regard, the platform credentials may be used to identify the user, such as, for example via a user identifier or any other indicia that could be correlated to the user. The platform credentials may also be used to authorize the user, as discussed further herein.

For example, the authentication control may comprise an authentication continuum. The authentication continuum may define a number or frequency of authentications required while operating the payload platform (e.g., the authentication continuum defines a number or frequency of required re-authentications). For example, the authentication continuum may define one or more of a continuous authentication, a time-based authentication, a situation-based authentication, a one-time authentication, no authentication, and/or the like. A continuous authentication control may require that the payload platform be continuously re-authenticated during operation (e.g., via biometric authentication, a physical authentication key, etc.). A time-based authentication may require that the payload platform be re-authenticated at a determined authentication interval (e.g., 1 minute, 5 minutes, daily, etc.). A situation-based authentication may require that the payload platform be re-authenticated based on a pre-defined event (e.g., payload platform is outside a defined geo-location, payload platform is targeting a non-combative target, payload platform is targeting an unknown target, payload platform indicates it has crashed or has been physically captured or moved, etc.). A one-time authentication may require that the payload platform be authenticated only once (e.g., at purchase, at registration, during a power-up, etc.). A no authentication control may comprise a least restrictive authentication continuum wherein no authentication is needed to access or operate the payload platform.

In various embodiments, an authentication continuum may be defined by a generated token. The token may comprise a web token, such as, for example, a JSON Web Token (JWT) and/or any other suitable web token. The token may comprise one or more claims (e.g., attributes) indicating accountability control data, authentication or user data, or the like. The token may also comprise data corresponding to the payload platform, such as a platform ID, an IP address, MAC address, or other suitable identifier. The token may also be digitally signed or encrypted, as discussed further herein. For example, in response to a payload platform accepting an authentication key the payload platform may generate the token. Upon expiration of the token, the payload platform may require re-authentication.

In accordance with various embodiments, an accountability control may comprise an authorization control. The authorization control may comprise one or more controls configured to specify permissions (e.g., rights, privileges, etc.) to resources, operations, and/or systems or devices. The authorization control may be configured to correlate an input from a user (e.g., an authentication input) with one or more permissions. For example, the authorization control may determine one or more platform permissions based on platform credentials associated with a user. The authorization control may be implemented and configured using any suitable process or technique.

The authorization control may comprise a platform permission. The platform permission may define one or more permissions to resources, operations, and/or the like of a payload platform. The platform permissions may be associated with a user, a group, a law enforcement agency, or the like. The platform permissions may be based on the payload platform that receives an authentication input. For example, different payload platforms may require, or be associated with, different platform permissions. The structure of a payload platform may dictate platform permissions. For example, a payload platform comprising a remote vehicle may comprise different platform permissions compared to a payload platform comprising a handheld firearm.

The platform permission may comprise an access permission. An access permission may grant access to the payload platform. For example, a payload platform may comprise an electronic device. The access permission may grant a user or system access to the handheld electronic device by powering up the electronic device. In some embodiments, powering up the electronic device may include selectively powering up one or more components of the electronic device. As a further example, a payload platform may comprise a handheld launcher stored in a secure box. The access permission may grant the user access to open the box and retrieve the handheld launcher. As a further example, a payload platform may comprise a remote vehicle having a mounted payload launcher. The access permission may grant the user or system access to the remote vehicle.

The platform permission may comprise an operate permission. The operate permission may grant a user or system the ability to operate the payload platform. For example, a payload platform may comprise a remote vehicle having a mounted payload launcher. The operate permission may enable a user or system to operate the remote vehicle, such as, for example, by flying or driving the remote vehicle. As a further example, a payload platform may comprise a payload launcher mounted to a structure. The operate permission may enable a user or system to aim the payload launcher, cause the payload launcher to change orientations, or the like.

The platform permission may comprise an accessory access permission. In some embodiments, a payload platform may comprise (or be in electronic communication with) one or more accessories, such as an aiming apparatus, a camera, a flashlight, or the like. The accessory access permission may control operation or one or more accessories of the payload platform. For example, in a payload platform having a camera the accessory access permission may grant a user or system access to operate the camera. In some embodiments, the accessory access permission may further comprise one or more accessory access sub-permissions, such as, for example, to view audio and/or visual data from the camera, to rotate or otherwise change orientation of the camera, to play audio from a microphone of the camera (or payload launcher), to stream a user's voice through the microphone of the camera (or payload launcher), and/or the like. As a further example, in a payload launcher comprising a handheld launcher the accessory access permission may grant a user or system access to a flashlight, an aiming apparatus (e.g., aiming lasers), or the like.

The platform permission may comprise a payload deployment permission. The payload deployment permission may control activation, deployment, and/or operation of one or more payloads of a payload platform.

The payload deployment permission may control whether a payload may be deployed or not. The payload deployment permission may also control whether an approval, confirmation, permission, or other signal is required to be received before deployment is enabled. For example, a payload deployment permission may require that a second user (e.g., a remote user) provide approval to deploy the payload before deployment of the payload is enabled.

The payload deployment permission may control a number of payloads enabled to be deployed from a payload platform (e.g., a payload number permission). For example, in a payload platform comprising a MCEW capable of deploying multiple payloads, the payload deployment permission may control a number of MCEW payloads a user or system may deploy (e.g., 0, 1, 2, etc.). The payload deployment permission may also control or define any other suitable or desired payload number permissions.

The payload deployment permission may control a type of payload enabled to be deployed from a payload platform, or by a user or a system (e.g., a payload type permission). For example, a user or system may be authorized to only deploy, or cause deployment of, a certain type of payload (e.g., a lethal payload, a nonlethal of less-lethal payload, a CEW payload, etc.). The payload deployment permission may also control or define any other suitable or desired payload type permissions.

The payload deployment permission may control a number of projectiles enabled to be deployed from a payload of a payload platform (e.g., a projectile permission). For example, in a payload platform comprising a CEW capable of deploying projectiles from a payload, the payload deployment permission may control a number of projectiles (e.g., electrodes) enabled to be deployed from a payload at once, a total number of projectiles enabled to be deployed, a number of separate deployments of projectiles enabled, and/or the like. The payload deployment permission may also control or define any other suitable or desired projectile permissions.

In embodiments wherein the payload platform comprises or includes a CEW, MCEW, or other electronic weapon configured to provide a stimulus signal through projectiles, the payload deployment permission may control the provision of the stimulus signal (e.g., a stimulus signal permission). For example, the payload deployment permission may control a length of time the stimulus signal is provided responsive to a single activation (e.g., 5 seconds, 30 seconds, etc.). As a further example, the payload deployment permission may control a total number of stimulus signals enabled to be provided (e.g., 1, 2, 3, etc.). The payload deployment permission may also control or define any other suitable or desired stimulus signal permissions.

In various embodiments, any one or more of the exemplary platform permissions may be combined into a single platform permission. In various embodiments, any one or more of the platform sub-permissions may also be separated into a platform permission, and/or may be combined with one or more other platform sub-permissions or platform permissions into a single platform permission. Moreover, any other platform permission, controlling operation or use of a payload platform, a payload, or the like, may also be implemented within the scope of this disclosure.

The authorization control may comprise one or more permission levels (e.g., tiers, groups, etc.). Each permission level may define zero or more platform permissions authorized within that permission level. For example, an authorization control may comprise three permission levels: a first level, a second level, and a third level. A first level may comprise basic operational platform permissions, such as the ability to access and/or operate a payload platform. A second level may comprise basic operational platform permissions together with one or more platform permissions to deploy payloads (e.g., deploy payloads, reenergize payloads, deploy second payloads, etc.). A third level may comprise unrestricted platform permissions. For example, a third level may comprise all platform permissions. Any other permission level schema, having any defined number of levels or distribution of platform permissions, may also be implemented within the scope of this disclosure.

In various embodiments, an authorization control may dictate that a first user (e.g., a local user) is authorized to perform some operations of a payload platform, but require that a second user (e.g., a remote user) perform the remaining operations of the payload platform. For example, authorization controls for a payload platform comprising a remote vehicle and a payload launcher may allow a first user to activate and/or operate the remote vehicle but require a second user to approve deployment or cause deployment of the payload. As a further example, authorization controls for a payload platform comprising a MCEW may allow a first user to deploy a first payload, but require a second user to approve reenergizing the first payload and/or deploying a second payload, as discussed further herein.

In accordance with various embodiments, an accountability control may comprise a custody control. The custody controls may comprise one or more controls configured to capture and record a chain of custody of events (e.g., processes, operations, commands, states, controls, etc.). For example, the custody control may require that data be captured recording a sequence of events of a payload platform (e.g., a payload platform sequence of events). The custody control may also require that data be captured recording a sequence of events across all of, or one or more device of, an accountability control system (e.g., a system sequence of events). In that respect, the custody control be configured to record, or cause recordation of, data for each input, action, event, deployment, etc. in the accountability control system.

The data recorded responsive to a custody control may include a timestamp of each input, action, event, deployment, etc. The data recorded responsive to a custody control may include correlation data correlating the user, device, or system responsible for the input, action, event, deployment, etc. For example, in response to a payload platform receiving an authentication input from a user, the custody control may capture a timestamp, an identifier associated with the user (e.g., a user identifier, the authentication input, etc.), metadata about the authentication input (e.g., the authentication type, etc.), an identifier associated with the payload platform (e.g., a payload platform identifier, a platform identifier, a payload identifier, etc.), and/or the like. As a further example, in response to the accountability control system authorizing a user, the custody control may capture a timestamp, an identifier associated with the user, an identifier associated with the device or system that authorized the user, the platform credentials associated with the user, the platform permissions authorized for the user, and/or the like.

The timestamp may include a date and/or a time (e.g., year, month, day, hour, minute, second, microsecond, etc.). The timestamp may comprise any suitable date and/or time format. The timestamp may be determined using any suitable process or system. For example, the timestamp may be determined using a Network Time Protocol (NTP), or based on an internal clock, an external clock, a network resource, a local resource, or the like.

In various embodiments, the custody control may be configured to capture any other data, metadata, or the like to create a chain of custody of actions in the accountability control system.

In accordance with various embodiments, an accountability control may comprise a security analysis of the payload platform (e.g., a security analysis control). The security analysis may include verifying compatibility of components of the payload platform (e.g., whether a payload is compatible with a payload launcher) (e.g., a component compatibility control). The security analysis may include determining whether a component of the payload platform was tampered with or otherwise compromised. The security analysis may also include any other hardware and/or software-based security controls or techniques implemented on the payload platform.

In various embodiments, the security analysis may comprise generating and/or comparing a device fingerprint of a payload platform, a payload, a platform, a payload launcher, and/or any other device in the accountability control system. The device fingerprint (e.g., machine fingerprint) may comprise information collected about software and/or hardware of the respective payload platform, payload, platform, payload launcher, and/or other device. The device fingerprint may be configured for the purpose of identification, and/or to ensure that a given device has not been compromised or otherwise tampered with. The device fingerprint may be generated using any suitable device fingerprinting algorithm. In various embodiments, a payload platform may be configured to generate a device fingerprint responsive to receiving an authentication input (or other access input). The payload platform, or other system or device in an accountability control system, may compare the device fingerprint to a previously generated device fingerprint to detect changes in hardware and/or software in the payload platform.

An accountability control may be controlled or implemented at one or more of a user level, a payload platform level, a platform level, and/or a payload level, as discussed further herein. Moreover, the accountability controls may be delegated and/or administered across any device in an accountability control system. For example, in some embodiments one or more accountability controls may be implemented locally while one or more other accountability controls are implemented remotely. As a further example, in some embodiments all accountability controls may be implemented in a payload platform. In some embodiments, authentication controls may be implemented in a payload platform while all other accountability controls are implemented in another system in the accountability control system (e.g., an authorization system). In some embodiments, authentication controls may be implemented in other systems or devices in an accountability control system while no accountability controls are implemented in a payload platform.

In various embodiments, accountability controls and the delegation and/or administration of accountability controls may be also be selectable based on a use case of user need. For example, each of the following uses may implement different accountability controls and administration: use of a payload platform by the military, use of a payload platform by a law enforcement agency, use of a payload platform by private security, and/or use of a payload platform by a civilian or in a home security system.

In various embodiments, and with reference to FIG. 1, a system 100 (e.g., an accountability control system) is disclosed. System 100 may comprise one or more of a payload platform 110, a network 101, and/or an authorization system 150. Payload platform 110 may be in electronic communication with authorization system 150. For example, payload platform 110 may be in electronic communication with authorization system 150 via network 101.

In various embodiments, network 101 may be configured to enable electronic communications between one or more systems or devices of system 100, such as payload platform 110 and authorization system 150. In that respect, network 101 may comprise any communication channel capable of enabling long-range communications or short-range communications. For example, network 101 may enable electronic communications through one or more communication channels such as a telephone network, a cellular network, an extranet, an intranet, the internet, a wireless communication, a wireless personal area network (WPAN), a local area network (LAN), a wide area network (WAN), a virtual private network (VPN), and/or the like.

In various embodiments, one or more of the communication channels enabling electronic communications in network 101 may be unsecure. Electronic communications disclosed herein via network 101 may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development. In various embodiments, electronic communications (and/or individual data in an electronic communication) may also be digitally signed, or may include any other security control.

For the sake of brevity, conventional data networking, application development, and other functional aspects of system may not be described in detail herein. Furthermore, the connecting lines shown in the various figures contained herein are intended to represent exemplary functional relationships and/or electronic communications between the various system 100 components. Many alternative or additional functional relationships or electronic communications may be present in a practical system or alternative implementation.

In various embodiments, payload platform 110 may comprise one or more devices or components configured to deliver (e.g., deploy, fire, etc.) a payload. Payload platform 110 may be similar to, or comprise similar components with, any other payload platform disclosed herein. For example, payload platform 110 may comprise a platform, device, or system configured to deploy a less-lethal or non-lethal projectile such as, for example, a conducted electrical weapon (CEW), a modular conducted electrical weapon (MCEW), a payload launcher, a projectile device configured to deploy entangling projectiles, and/or the like. Payload platform 110 may comprise a standalone device or may comprise a platform, device, or system configured to deploy a less-lethal or non-lethal projectile in electronic communication with a second electronic device, as discussed further herein. As a further example, payload platform 110 may comprise a platform, device, or system configured to deploy a lethal projectile such as, for example, a firearm (e.g., a rifle, a handgun, a shotgun, etc.). In that regard, payload platform 110 may comprise a firearm controlled by or in communication with an electronic device. The electronic device may be configured to provide accountability controls to the firearm and/or enable electronic communications, as discussed further herein.

In various embodiments, payload platform 110 may comprise, or be in electronic communication with, a computing device such as a server, a computer-based system, a portable computer-based system (e.g., a laptop, a notebook, a hand held computer, a tablet, a personal digital assistant, etc.), a cellular phone, a smart phone (e.g., IPHONE®, BLACKBERRY®, ANDROID®, etc.), a wearable device (e.g., a smart watch, smart glasses, etc.), an internet of things (IoT) device, and/or any other device capable of transmitting and/or receiving data over a network.

Payload platform 110 may comprise one or more software and/or hardware components. For example, payload platform 110 may comprise hardware such as a processing unit, a communications unit, a memory unit, an input device, and/or an output device. Payload platform 110 may comprise software configured to manage and/or interact with the hardware components, such as, for example, an operating system, user interfaces, software applications, and/or the like.

In various embodiments, payload platform 110 may include a processor in electronic communication with a computer-readable medium. The computer-readable medium may store, retrieve, and/or organize data. As used herein, the term "computer-readable medium" includes any storage medium that is readable by a machine (e.g., computer, processor, processing circuit, etc.). A storage medium includes any devices, materials, and/or structures used to place, keep, and retrieve data (e.g., information). A storage medium may be volatile or non-volatile. A storage medium may include any semiconductor (e.g., RAM, ROM, EPROM, flash, etc.), magnetic (e.g., hard disk drive (HDD), etc.), solid state (e.g., solid-state drive (SSD), etc.), optical technology (e.g., CD, DVD, etc.), or combination thereof. A computer-readable medium may include a storage medium that is removable or non-removable from a system. A computer-readable medium may store any type of information, organized in any manner, and usable for any purpose such as computer readable instructions, data structures, program modules, or other data. The computer-readable medium may comprise a tangible, non-transitory computer-readable medium. The tangible, non-transitory computer-readable medium may include instructions stored thereon. Upon execution by the processor, the instructions may allow the processor to perform various functions and operations disclosed herein.

In various embodiments, payload platform 110 may comprise one or more components configured to deploy a payload. For example, payload platform 110 may comprise a propulsion system, a propellant (e.g., air, gas, etc.), a primer, or the like capable of providing a propulsion force to cause deployment of the payload. In some embodiments wherein payload platform 110 comprises a lethal firearm, payload platform 110 may comprise a firing mechanism configured to cause deployment of a firearm ammunition such as, for example, a firearm action, a hammer or striker, or the like.

In various embodiments payload platform 110 may include one or more location services. A location service may comprise software and/or hardware components on payload platform 110. The location services may be configured to provide location details for security payload platform 110. For example, the location services may comprise an onboard global positioning system (GPS) which provides location (e.g., coordinates) of payload platform 110. The location service may also comprise a compass which provides a direction of view or movement of payload platform 110, and/or an accelerometer which may detect a speed and/or acceleration of movement of payload platform 110. Collectively, the information collected by the location services may be referred to as "location information." The location services may also comprise tools, software, and the like configured to gather, associate, store, and/or transmit the location information.

In various embodiments, payload platform 110 may comprise (or be configured to comprise or in electronic communication with) one or more accessories. For example, an accessory may comprise a recording device (e.g., camera, body-worn camera, CCTV camera, audio input component, microphone, etc.) configured to capture audio and/or visual data. An accessory may comprise an audio output component (e.g., speaker) configured to output audio data. An accessory may comprise an aiming apparatus configured to at least partially aid in accurately deploying payloads (or projectiles of a payload) from payload platform 110. For example, an aiming apparatus may comprise a sight, a pair of sights (e.g., a front sight and a rear sight), a telescopic sight (e.g., a scope, an optical sighting device, etc.), a red-dot sight, a holographic sight, a night vision sight, a fiber-optic sight, a laser sight, and/or any other suitable or desired system or apparatus to aid in aiming payload platform 110. An accessory may comprise a light-emitting component, such as a flashlight, a tactical flashlight, a strobe light, or any other light-emitting component. In various embodiments, a location service may be an accessory.

In various embodiments, payload platform 110 may be configured to receive inputs, controls, operations, or the like. For example, payload platform 110 may be configured to receive inputs, controls, operations, or the like from a user 5. User 5 may access, operate, deploy payloads from, and otherwise control payload platform 110, in whole or in part. User 5 may access payload platform 110 directly, via a control interface, and/or through any other access means. User 5 may be registered with accountability control system 100. In some embodiments, user 5 may provide an authentication input with payload platform 110, as disclosed further herein.

As a further example, payload platform 110 may be configured to receive inputs, controls, operations, activations, or the like from a system or device of system 100. For example, a home security system, a home monitoring system, a private security system, a public security system, or the like (e.g., a third-party system) may be in electronic communication with payload platform. The third-party system may be configured to remotely access, control, operate, deploy payloads, and/or otherwise control payload platform 110, in whole or in part. The third-party system may be registered with accountability control system 100. In some embodiments, the third-party system may provide an authentication input with payload platform 110, as disclosed further herein.

Figure 3A:
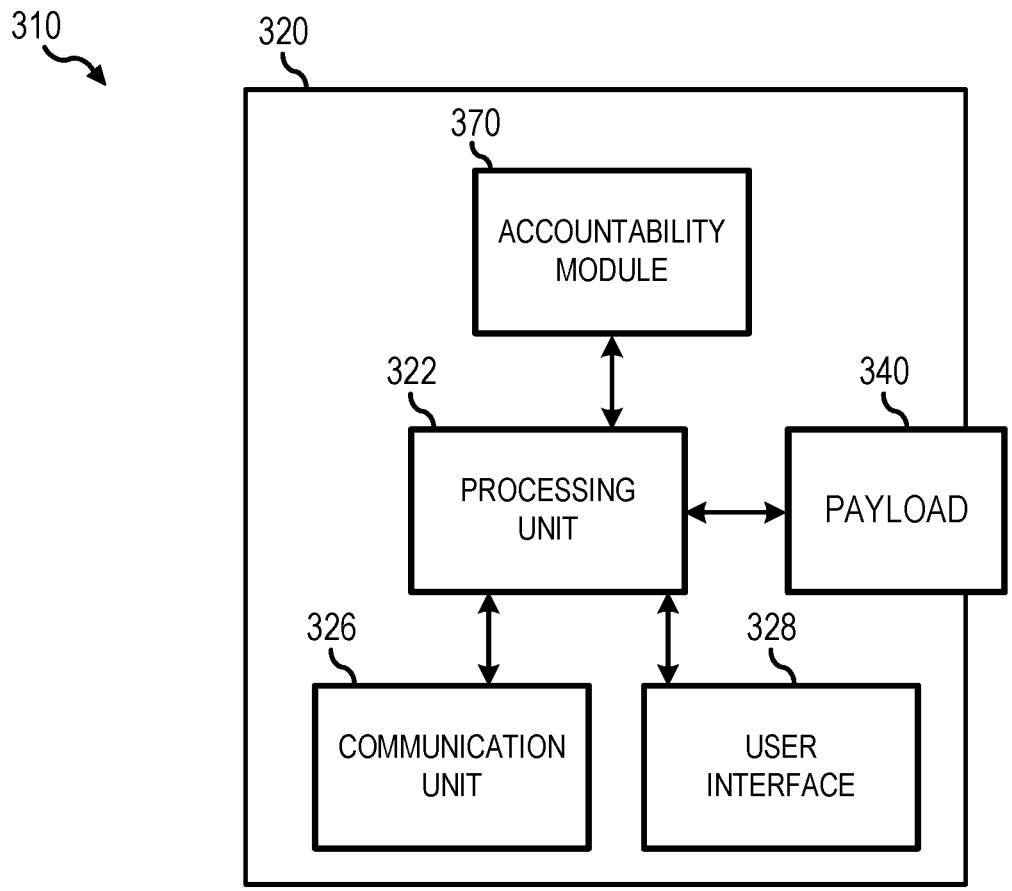
FIG. 3A is a block diagram illustrating a payload platform, in accordance with various embodiments.

In various embodiments, and with reference to FIG. 3A, a payload platform 310 may comprise an electronic device 320. Electronic device 320 may be similar to any electronic device or payload platform described herein. Electronic device 320 may comprise any electronic device capable of deploying a payload 340. Electronic device 320 may comprise one or more hardware and/or software components. For example, electronic device 320 may comprise a processing unit 322, a communications unit 326, a user interface 328, and/or an accountability module 370.

In various embodiments, payload 340 may include any payload, projectile, or the like disclosed herein. For example, payload 340 may include any object, projectile, or the like configured to be deployed from payload platform 310 (or electronic device 320). Payload 340 may also include an object, unit, device, or the like configured to deploy any object, projectile, or the like. For example, and in accordance with various embodiments, payload 340 may comprise a lethal projectile. As a further example, and in accordance with various embodiments, payload 340 may comprise a non-lethal or less-lethal projectile.

In various embodiments, processing unit 322 may be similar to any other processing unit, processor, or the like described herein. Processing unit 322 may comprise any circuitry, electrical components, electronic components, software, and/or the like configured to perform various operations and functions discussed herein. For example, processing unit 322 may comprise a processing unit described herein, a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof.

Processing unit 322 may be configured to provide and/or receive electrical signals whether digital and/or analog in form. Processing unit 322 may provide and/or receive digital information via a data bus using any protocol. Processing unit 322 may receive information, manipulate the received information, and provide the manipulated information. Processing unit 322 may store information and retrieve stored information. Information received, stored, and/or manipulated by processing unit 322 may be used to perform a function, control a function, and/or to perform an operation or execute a stored program.

Processing unit 322 may control the operation and/or function of other circuits and/or components of electronic device 320. Processing unit 322 may receive status information regarding the operation of other components, perform calculations with respect to the status information, and provide commands (e.g., instructions) to one or more other components. Processing unit 322 may command another component to start operation, continue operation, alter operation, suspend operation, cease operation, or the like. Commands and/or status may be communicated between processing unit 322 and other circuits and/or components via any type of electronic communication.

In various embodiments, processing unit 322 may also comprise (or be in electronic communication with) a memory unit capable of storing and maintaining data. The memory unit may comprise any memory unit, database, data structure, memory component, or the like disclosed herein.

In various embodiments, communications unit 326 may be similar to, or comprise similar components with, any other communications unit, short-range communications unit, long-range communications unit, or the like disclosed here. Communications unit 326 may enable electronic communications between devices and systems. Communications unit 326 may enable communications over a network (e.g., network 101, with brief reference to FIG. 1). For example, communications unit 326 may include a modem, a network interface (such as an Ethernet card), a communications port, or the like. Data may be transferred via communications unit 326 in the form of signals which may be electronic, electromagnetic, optical, or other signals capable of being transmitted or received by a communications unit. Communications unit 326 may be configured to communicate via any wired protocol, wireless protocol, or other protocol capable of transmitting information via a wired or wireless connection. In various embodiments, communications unit 326 may be configured to enable short-range communications between devices. In various embodiments, communications unit 326 may be configured to enable long-range communications between devices or systems. In various embodiments, communications unit 326 may be configured to enable both short-range communications and long-range communications.

In various embodiments, user interface 328 may be configured to allow a user to interact with payload platform 310 (or electronic device 320). User interface 328 may comprise software, a mobile application, an interface, or the like. User interface 328 may comprise a graphical user interface configured to allow the user to input and view data. User interface 328 may comprise a physical interface such as a keypad, a number pad, a physical lock, cable connection interface (e.g., USB port), and/or the like. User interface 328 may comprise a biometric reader, as discussed further herein. User interface 328 may comprise an interface configured to receive electronic signals, such as, for example, a BLUETOOTH® receiver, an NFC receiver, or the like.

In various embodiments, accountability module 370 may be configured to provide one or more accountability controls to payload platform 310 (or electronic device 320). Accountability module 370 may comprise one or more software and/or hardware components capable of providing the one or more accountability controls. The accountability controls may be configured to provide accountability to the operation and deployment of payload platform 310 (or electronic device 320). For example, the accountability controls may be configured to control access to and/or operation of payload platform 310 (or electronic device 320). The accountability controls may be configured to control access to, operation of, and/or deployment of projectiles or payloads 340 from payload platform 310 (or electronic device 320). The accountability controls may be configured to generate a record of events of payload platform 310 (or electronic device 320).

For example, and in accordance with various embodiments, accountability module 370 may be configured to provide one or more of an authentication control, an authorization control, a custody control, and/or a security analysis control. The authentication control may comprise one or more of the authentication controls previously disclosed herein. The authorization control may comprise one or more of the authorization controls previously disclosed herein. The custody control may comprise one or more of the custody controls previously disclosed herein. The security analysis control may comprise one or more of the security analysis controls previously discussed herein.

In various embodiments, accountability module 370 may be configured to provide one or more accountability controls while a second device or system in accountability control system 100 provides one or more other accountability controls (e.g., authorization system 150, with brief reference to FIG. 1).

For example, in some embodiments, accountability module 370 may be configured to provide all accountability controls (e.g., selected accountability controls, enabled accountability controls, etc.) directly for payload platform 310 (or electronic device 320).

As a further example, in some embodiments, accountability module 370 may be configured to provide a portion of accountability controls. In that regard, accountability module 370 may provide authentication controls (e.g., a local authentication) while a separate system or device of system 100 (e.g., authorization system 150, with brief reference to FIG. 1) provides authorization controls (e.g., a remote authorization). Both accountability module 370 and the separate system or device of system 100 may provide custody controls. In some embodiments, accountability module 370 may also provide system analysis controls.

As a further example, in some embodiments, accountability module 370 may be configured to provide no accountability controls. In that regard, payload platform 310 (or electronic device 320) may be subject to no accountability controls (e.g., no authentication, authorization, etc. needed). In other embodiments, a separate system or device of system 100 (e.g., authorization system 150, with brief reference to FIG. 1) may provide all accountability controls (e.g., selected accountability controls, enabled accountability controls, etc.) directly for payload platform 310 (or electronic device 320).

In various embodiments, accountability module 370 may disable or enable one or more features, systems, or the like of payload platform 320 (or electronic device 320) based on the authentication control, authorization control, and/or system analysis control. Enabling or disabling one or more features, systems, or the like of payload platform 320 (or electronic device 320) may include software, electronic, electrical, and/or mechanical features configured to enable or disable the one or more features, systems, or the like. For example, power may be selectively provided or not provided to a feature or system to disable or enable the feature or system. As a further example, a mechanical feature may be used to disable a feature or system by mechanically obstructing the feature or system (and enabling the feature or system or mechanically de-obstructing the feature or system). As a further example, software and/or electronics may be configured to selectively enable or disable a feature or system.

As an example, in response to an authentication input received for an authentication control failing to authenticate (e.g., an authentication input not matching a platform credential), accountability module 370 may disable (or not enable) one or more components of payload platform 320 (or electronic device 320). In some embodiments, failing to authenticate may cause all components of payload platform 320 (or electronic device 320) to disable. In some embodiments, accountability module 370 may temporarily disable (or temporarily not enable) one or more components (e.g., a timeout for 5 minutes, an hour, etc.). In some embodiments, accountability module 370 may provide a number of failed inputs before disabling (or not enabling) one or more components (e.g., three failed inputs).

As a further example, authorization controls may grant one or more platform permissions to payload platform 320 (or electronic device 320). As previously discussed, the platform permission may define one or more permissions to resources, operations, and/or the like of a payload platform. Accountability module 370 may selectively enable or disable one or more resources, features, systems, or the like of payload platform 320 (or electronic device 320) based on the platform permission. For example, for a platform permission allowing access to or operation of payload platform 320 (or electronic device 320), but not deployment of payload 340 from payload platform 320 (or electronic device 320), accountability module 370 may enabling (or not disable) resources, features, or systems needed to access or operate payload platform 320 (or electronic device 320) while disabling (or not enabling) other resources, features, or systems needed to deploy payload 340.

As a further example, in response to a security analysis control failing (e.g., indicating that payload platform 320 or electronic device 320 was tampered with or was otherwise compromised), accountability module 370 may disable all components of payload platform 320 (or electronic device 320). Accountability module 370 may also reset, wipe system data, require or start a system update, or perform other actions on payload platform 320 (or electronic device 320) in response to a security analysis control failing. In some embodiments, accountability module 370 may also display an error, play a sound, or perform another action via an interface or accessory of payload platform 320 (or electronic device 320) in response to a security analysis control failing. In other embodiments, accountability module 370 may also cause payload platform 320 (or electronic device 320) to enter an emergency mode wherein an outside party is contacted or notified to enable operations or features of payload platform 320 (or electronic device 320). For example, a remote control system, a law enforcement agency, a security provider, or the like may be contacted or notified.

In various embodiments, accountability module 370 may comprise a database, memory, and/or the like configured to store and maintain data necessary for accountability module 370 to provide the one or more accountability controls (e.g., accountability control data). For example, the accountability control data may comprise authentication data (e.g., platform credentials, user information, etc.), authorization data (e.g., platform permissions), custody control data, security analysis control data, and/or the like. In various embodiments, payload platform 310 (or electronic device 320) may receive the accountability control data during a registration process, as a download from a device or system of system 100 (e.g., authorization system 140), and/or using any other process. In various embodiments, the receipt (and transmittal) of accountability control data may be on a periodic basis to ensure that payload platform 310 (or electronic device 320) maintains verified and up-to-date accountability control data (e.g., hourly, daily, weekly, monthly, etc.).

In various embodiments, accountability module 370 (separately or together with user interface 328) may comprise a lock or similar physical interface configured to receive a physical key from a user.

In various embodiments, accountability module 370 (separately or together with user interface 328) may comprise a female end of a cable connection interface, a universal serial bus, a proprietary bus, or the like configured to receive a hardware security key.

In various embodiments, accountability module 370 (separately or together with user interface 328) may comprise an interface configured to receive electronic signals (e.g., virtual authentication) such as a BLUETOOTH® receiver, an NFC receiver, or the like.

In various embodiments, accountability module 370 (separately or together with user interface 328) may comprise a biometric security system that may be used for providing or accepting biometrics as a primary or secondary form of identification (e.g., an authentication input). The biometric security system may include a transponder and a reader. The biometric security system may include a biometric sensor that detects biometric samples and a device for verifying biometric samples. The biometric security system may be configured with one or more biometric scanners, processors, and/or systems. The biometric security system may also include software configured to receive and/or interpret a biometric input. A biometric system may include one or more technologies, or any portion thereof. As used herein, a biometric may include a user's voice, fingerprint, face, ear, signature, vascular patterns, DNA sampling, hand geometry, sound, olfactory, keystroke/typing, iris, retinal, and/or any other biometric relating to recognition based upon any body part, function, system, attribute and/or other characteristic, or any portion thereof.

Figure 3B:
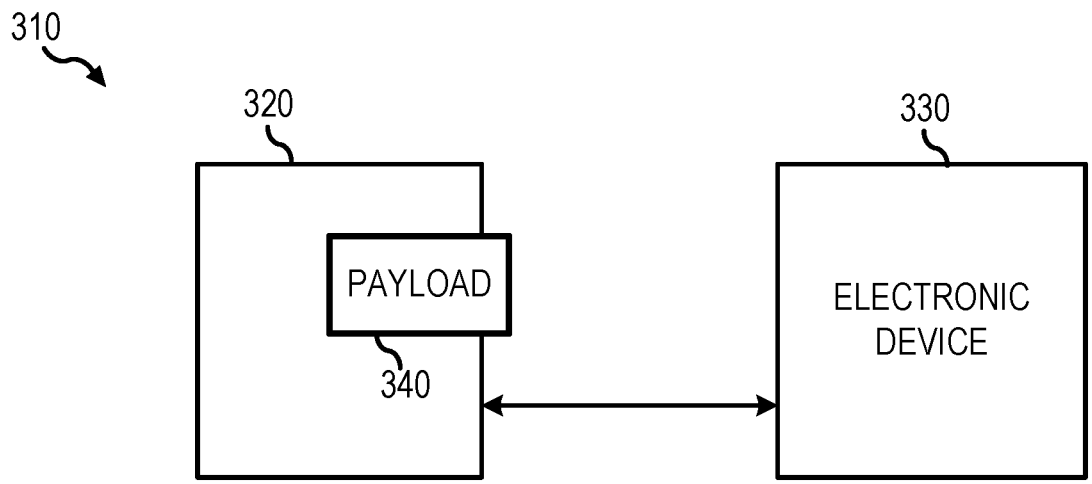
FIG. 3B is a block diagram illustrating a payload platform including a first electronic device and a second electronic device, in accordance with various embodiments.

In various embodiments, and with reference to FIG. 3B, payload platform 310 may comprise electronic device 320 (e.g., a first electronic device) configured to deploy payload 340 and a second electronic device 330 in electronic communication with electronic device 320. Second electronic device 330 may be similar to any other electronic device disclosed herein. Second electronic device 330 may comprise hardware and/or software components. For example, second electronic device 330 may comprise a processing unit, a communications unit, a memory, and/or any other device, unit, or system.

In various embodiments, second electronic device 330 may be configured to provide one or more features or capabilities to electronic device 320. For example, in accordance with various embodiments, second electronic device 330 may be configured to provide long-range communication capabilities to electronic device 320. In that respect, electronic device 320 may be in short-range communication with second electronic device 330. Electronic device 320 may transmit data to second electronic device 320, that may then relay or transmit the data via a network or other long-range communication to a device or system in an accountability control system. In various embodiments, second electronic device 330 may also be configured to relay or transmit operations or controls to electronic device 320.

In various embodiments, second electronic device 330 may also comprise an accountability module configured to provide one or accountability controls on electronic device 320. For example, second electronic device 330 may comprise an accountability module (e.g., a second accountability module) configured to provide the one or more accountability controls. The accountability module may be similar to any other accountability module, system, or the like disclosed herein.

In various embodiments, and with reference again to FIG. 1, authorization system 150 may comprise any combination of hardware and/or software components. For example, authorization system 150 may comprise hardware such as a processing unit, a communications unit, a memory unit, an input device, and/or an output device. Authorization system 150 may also comprise software configured to manage and/or interact with the hardware components, such as, for example, an operating system, user interfaces, software applications, databases, and/or the like.

Authorization system 150 may comprise at least one computing device in the form of a computer or processor, or a set of computers and/or processors, although other types of computing units or systems may be used, such as, for example, a server, a web server, a pooled server, an application server, a computer-based system, and/or the like. Authorization system 150 may also include one or more data centers, cloud storages, or the like, and may include software, such as application programming interfaces (APIs), software development kits (SDKs), web services, executables, or the like configured to perform various operations, functions, and steps discussed herein. In various embodiments, authorization system 150 may be computer-based, and may comprise a processor, a tangible non-transitory computer-readable memory, and/or a network interface, along with other suitable system software and hardware components. Instructions stored on the tangible non-transitory memory may allow authorization system 150 to perform various operations, functions, and/or steps, as described herein.

In various embodiments, authorization system 150 may be configured to provide one or more accountability controls to devices or systems in accountability control system 100. For example, authorization system 150 may be configured to provide one or more accountability controls to payload platform 110 (e.g., remote accountability controls).

Authorization system 150 may comprise one or more software and/or hardware components capable of providing the one or more accountability controls. The accountability controls may be configured to provide accountability to the operation and deployment of payload platform 110. For example, the accountability controls may be configured to control access to and/or operation of payload platform 110. The accountability controls may be configured to control access to, operation of, and/or deployment of projectiles or payloads from payload platform 110. The accountability controls may be configured to generate a record of events of payload platform 110 and/or authorization system 150.

For example, and in accordance with various embodiments, authorization system 150 may be configured to provide one or more of an authentication control, an authorization control, a custody control, and/or a security analysis control. The authentication control may comprise one or more of the authentication controls previously disclosed herein. The authorization control may comprise one or more of the authorization controls previously disclosed herein. The custody control may comprise one or more of the custody controls previously disclosed herein. The security analysis control may comprise one or more of the security analysis controls previously discussed herein.

In various embodiments, authorization system 150 may be configured to provide one or more accountability controls while a second device or system in accountability control system 100 provides one or more other accountability controls (e.g., payload platform 110).

For example, in some embodiments, authorization system 150 may be configured to provide all accountability controls (e.g., selected accountability controls, enabled accountability controls, etc.) for payload platform 110.

As a further example, in some embodiments, authorization system 150 may be configured to provide a portion of accountability controls. In that regard, for example, authorization system 150 may provide authorization controls (e.g., a remote authorization) while payload platform 110 provides authentication controls (e.g., a local authentication). Both authorization system 150 and payload platform 110 may provide custody controls. In some embodiments, payload platform 110 and/or authorization system 150 may also provide system analysis controls.

As a further example, in some embodiments, authorization system 150 may be configured to provide no accountability controls. In that regard, payload platform 110 may be configured to provide all accountability controls (e.g., no accountability controls, selected accountability controls, enabled accountability controls, etc.) directly for payload platform 110.

In various embodiments, authorization system 150 may comprise a database, memory, or the like configured to store and maintain data necessary to provide the one or more accountability controls (e.g., accountability control data). For example, the accountability control data may comprise authentication data (e.g., platform credentials, user information, etc.), authorization data (e.g., platform permissions), custody control data, security analysis control data, and/or the like. In various embodiments, authorization system 150 may receive the accountability control data during a registration process and/or using any other process.

In various embodiments, authorization system 150 may comprise or be in electronic communication with an evidence management system. An evidence management system receives, provides, manages, and/or stores evidence. An evidence management system may store evidence of operations performed in accountability control system 100, such as custody control data, operational data of payload platform 110, and/or the like. For example, in a practical application the evidence management system may store evidence (e.g., data) received from a law enforcement agency, a security provider, or the like. The evidence may also include any other type of data including text, audio, image, and/or video. The evidence may be stored on servers or databases and accessed via a network. An evidence management system may include a server to perform the functions of an evidence management system. The server may include one or more servers and/or computing devices. The server may control other electronic devices to perform the functions of an evidence management system. The server may include engines and data stores which operate to store and process data and metadata received from systems and devices in system 100. In various embodiments, the evidence management system may comprise a cloud-based distributed evidence management system, such as, for example, AXON EVIDENCE digital evidence management system (DEMS) offered by Axon Enterprise, Inc.

Figure 2:
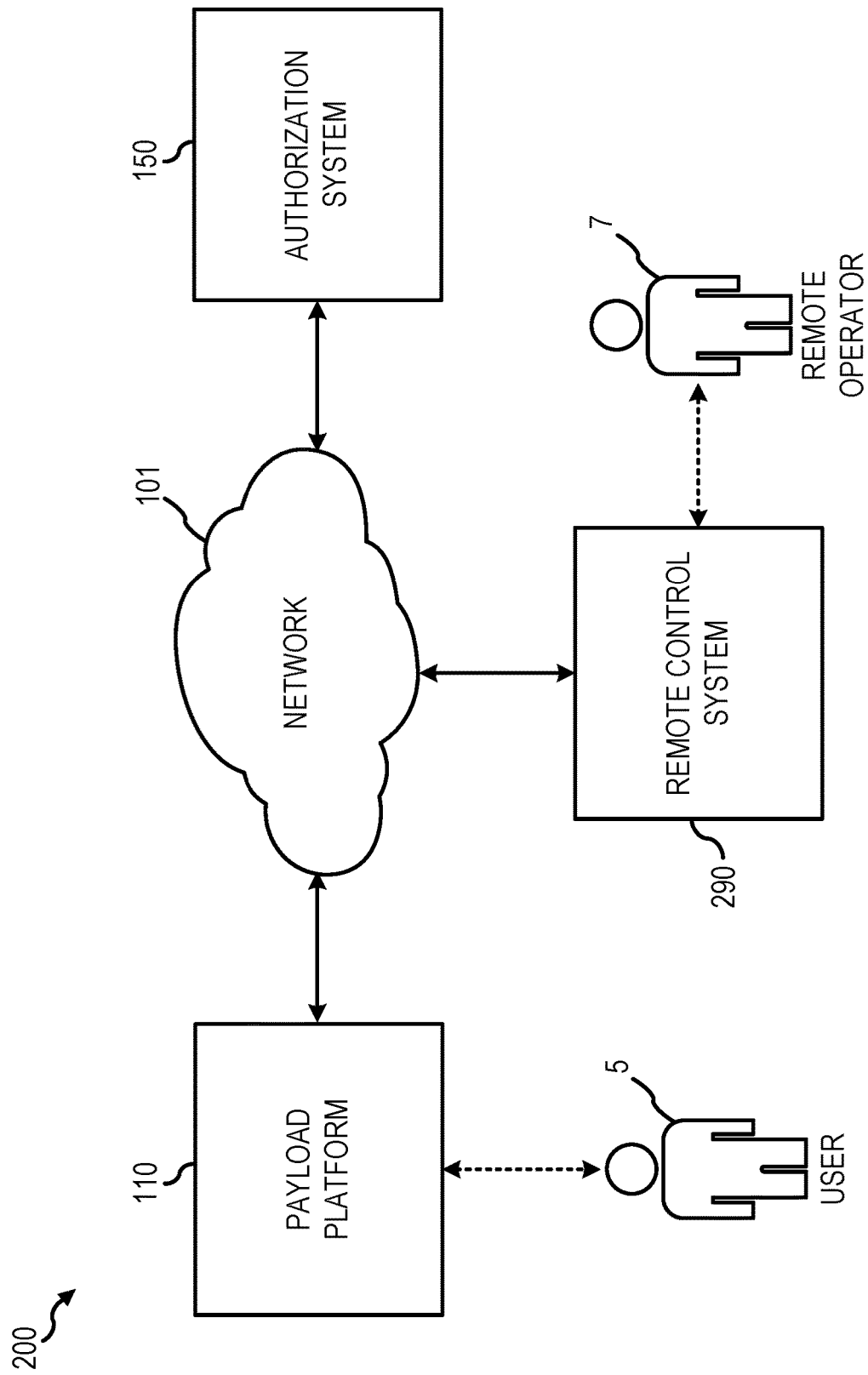
FIG. 2 is a block diagram illustrating system components of an accountability control system comprising a remote control system, in accordance with various embodiments.

In various embodiments, and with reference to FIG. 2, a system 200 (e.g., an accountability control system 200) may also comprise a remote control system 290. Remote control system 290 may be in electronic communication with one or more of payload platform 110 and/or authorization system 150 via network 101.

In various embodiments, remote control system 290 may be part of (e.g., physically, virtually, organizationally, etc.) authorization system 150. For example, an agency, service, organization, or the like may offer services for authorization system 150 and remote control system 290. In various embodiments, remote control system 290 may also be a standalone system in system 200, distinct from authorization system 150.

In various embodiments, remote control system 290 may comprise any combination of hardware and/or software components. For example, remote control system 290 may comprise hardware such as a processing unit, a communications unit, a memory unit, an input device, and/or an output device. Remote control system 290 may also comprise software configured to manage and/or interact with the hardware components, such as, for example, an operating system, user interfaces, software applications, databases, and/or the like.

Remote control system 290 may comprise at least one computing device in the form of a computer or processor, or a set of computers and/or processors, although other types of computing units or systems may be used, such as, for example, a server, a web server, a pooled server, an application server, a computer-based system, and/or the like. Remote control system 290 may also include one or more data centers, cloud storages, or the like, and may include software, such as application programming interfaces (APIs), software development kits (SDKs), web services, executables, or the like configured to perform various operations, functions, and steps discussed herein. In various embodiments, remote control system 290 may be computer-based, and may comprise a processor, a tangible non-transitory computer-readable memory, and/or a network interface, along with other suitable system software and hardware components. Instructions stored on the tangible non-transitory memory may allow remote control system 290 to perform various operations, functions, and/or steps, as described herein.

In various embodiments, remote control system 290 may be configured to provide remote operation to payload platform 110. For example, remote control system 290 may be configured to remotely operate payload platform 110, access or operate accessories or other components of payload platform 110, deploy payloads from payload platform 110, and/or perform any other remote operation, as discussed further herein.

In various embodiments, a remote operator 7 may remotely operate payload platform 110 via remote control system 290. For example, remote operator 7 may access remote control system 290. Remote control system 290 may be granted access to payload platform 110 (e.g., via network 101). Remote operator 7 may access and/or operate payload platform 110 via remote control system 290 and network 101. Remote operator 7 may be registered and/or authorized with remote control system 290.

In various embodiments, remote control system 290 may establish remote operation over payload platform 110 using any suitable process or technique. For example, remote control system 290 may receive a remote operator request (e.g., from authorization system 150, payload platform 110, etc.). The remote operator request may specify the remote operations to be performed (e.g., as discussed above). Remote control system 290 may determine the remote operator qualifications and may select a remote operator 7 based on the remote operator qualifications (e.g., a remote operator 7 having qualifications at least partially matching the remote operator qualifications).

Remote control system 290 may establish an electronic communication channel with payload platform 110. The electronic communication channel may enable communications between remote control system 290 and payload platform 110, such as remote operator commands. Remote control system 290 may establish a secure electronic communication channel with payload platform 110 via network 101. The secure electronic communication channel may be established using any suitable process or technology. For example, remote control system 290 may establish a virtual private network (VPN) extending across network 101 and accessible by remote control system 290 and payload platform 110. Establishing a VPN, including the use of tunneling protocols, security protocols, and/or the like is known in the art.

In various embodiments, remote control system 290 may be configured to provide one or more accountability controls. For example, remote control system 290 may provide a custody control to capture and record events occurring from remote control system 290, as discussed further herein.

Figure 4:
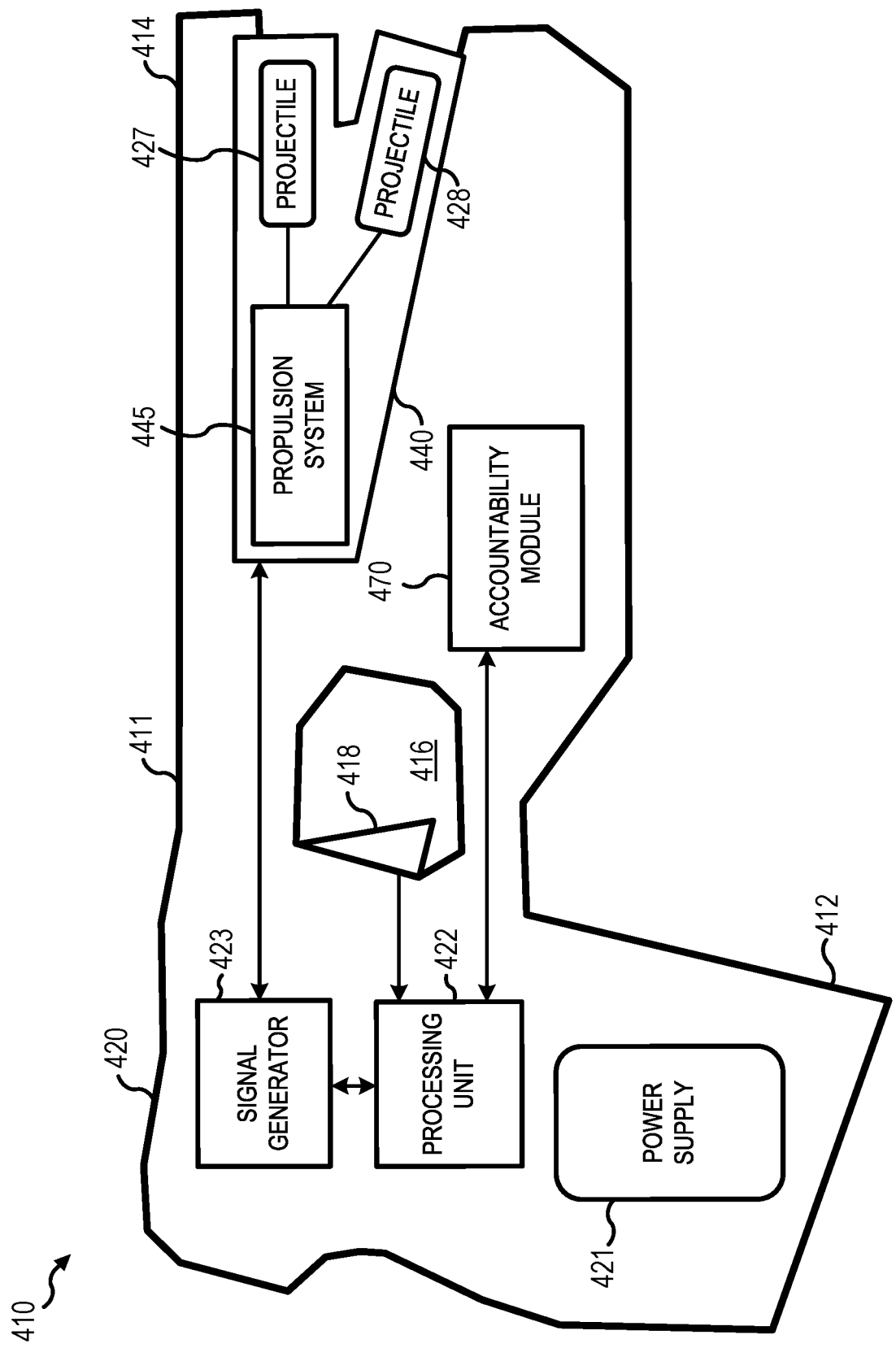
FIG. 4 is a block diagram illustrating a payload platform including a conducted electrical weapon, in accordance with various embodiments.

In various embodiments, and with reference to FIG. 4, a payload platform 410 may comprise a conducted electrical weapon (CEW) 420. CEW 420 may be configured to interfere with voluntary locomotion (e.g., walking, running, moving, etc.) of a target. For example, CEW 420 may be used to deliver a current (e.g., stimulus signal, pulses of current, pulses of charge, etc.) through tissue of a human or animal target. Although typically referred to as a conducted electrical weapon, as described herein CEW 420 may refer to a conducted electrical weapon, a conducted energy weapon, an electronic control device, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to CEW 420. Delivery via terminals may be referred to as a local delivery (e.g., a local stun, a drive stun, etc.). During local delivery, the terminals are brought close to the target by positioning CEW 420 proximate to the target. The stimulus signal is delivered through the target's tissue via the terminals. To provide local delivery, the user of CEW 420 is generally within arm's reach of the target and brings the terminals of CEW 420 into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, CEW 420 may be separated from the target up to the length (e.g., 15 feet, 20 feet, 30 feet, etc.) of the wire tether. CEW 420 launches the electrodes towards the target. As the electrodes travel toward the target, the respective wire tethers deploy behind the electrodes. The wire tether electrically couples CEW 420 to the electrode. The electrode may electrically couple to the target thereby coupling CEW 420 to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of CEW 420 may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

CEW 420 may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of CEW 420 may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. CEW 420 having a signal generator providing stimulus signals at only a low voltage (e.g., a low voltage signal generator) may require deployed electrodes to be electrically coupled to the target by contact (e.g., touching, spear embedded into tissue, etc.).

CEW 420 may include at least two terminals at the face of CEW 420. CEW 420 may include two terminals for each bay that accepts a deployment unit (e.g., cartridge). The terminals are spaced apart from each other. In response to the electrodes of the deployment unit in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of CEW 420 via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on CEW 420 are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, CEW 420 may be hand-held or mounted on a platform (as discussed further herein) and use batteries to provide the pulses of the stimulus signal. In response to the amount of charge per pulse being high and the pulse rate being high, CEW 420 may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, CEW 420 may include a handle and one or more deployment units (e.g., payloads). The handle may include one or more bays for receiving the deployment units. Each deployment unit may be removably positioned in (e.g., inserted into, coupled to, etc.) a bay. Each deployment unit may releasably electrically, electronically, and/or mechanically couple to a bay. A deployment of CEW 420 may launch one or more electrodes toward a target to remotely deliver the stimulus signal through the target.

In various embodiments, a deployment unit may include two or more electrodes that are launched at the same time. In various embodiments, a deployment unit may include two or more electrodes that may be launched individually at separate times. Launching the electrodes may be referred to as activating (e.g., firing) a deployment unit. After use (e.g., activation, firing), a deployment unit may be removed from the bay and replaced with an unused (e.g., not fired, not activated) deployment unit to permit launch of additional electrodes.

In various embodiments, CEW 420 may comprise a housing 411 and one or more payloads 440 (e.g., deployment units, cartridges, etc.). It should be understood by one skilled in the art that FIG. 4 is a schematic representation of CEW 420, and one or more of the components of CEW 420 may be located in any suitable position within, or external to, housing 411.

Housing 411 may be configured to house various components of CEW 420 that are configured to enable deployment of payload 440, provide an electrical current to payload 440, and otherwise aid in the operation of CEW 420, as discussed further herein. Although depicted as a firearm in FIG. 4, housing 411 may comprise any suitable shape and/or size. Housing 411 may comprise a handle end 412 opposite a deployment end 414. Deployment end 414 may be configured, and sized and shaped, to receive one or more payload 440. Handle end 412 may be sized and shaped to be held in a hand of a user. For example, handle end 412 may be shaped as a handle to enable hand-operation of CEW 420 by the user. In various embodiments, handle end 412 may also comprise contours shaped to fit the hand of a user, for example, an ergonomic grip. Handle end 412 may include a surface coating, such as, for example, a non-slip surface, a grip pad, a rubber texture, and/or the like. As a further example, handle end 412 may be wrapped in leather, a colored print, and/or any other suitable material, as desired.

In various embodiments, housing 411 may comprise various mechanical, electronic, and/or electrical components configured to aid in performing the functions of CEW 420. For example, housing 411 may comprise one or more triggers 418, control interfaces, processing units 422, power supplies 421, and/or signal generators 423. Housing 411 may also comprise an accountability module 470. Housing 411 may include a guard 416. Guard 416 may define an opening formed in housing 411. Guard 416 may be located on a center region of housing 411 (e.g., as depicted in FIG. 1), and/or in any other suitable location on housing 411. Trigger 418 may be disposed within guard 416. Guard 416 may be configured to protect trigger 418 from unintentional physical contact (e.g., an unintentional activation of trigger 418). Guard 416 may surround trigger 418 within housing 411.

In various embodiments, trigger 418 be coupled to an outer surface of housing 411, and may be configured to move, slide, rotate, or otherwise become physically depressed or moved upon application of physical contact. For example, trigger 418 may be actuated by physical contact applied to trigger 418 from within guard 416. Trigger 418 may comprise a mechanical or electromechanical switch, button, trigger, or the like. For example, trigger 418 may comprise a switch, a pushbutton, and/or any other suitable type of trigger. Trigger 418 may be mechanically and/or electronically coupled to processing unit 422. In response to trigger 418 being activated (e.g., depressed, pushed, etc. by the user), processing unit 422 may enable deployment of one or more payload 440 from CEW 420, as discussed further herein.

In various embodiments, power supply 421 may be configured to provide power to various components of CEW 420. For example, power supply 421 may provide energy for operating the electronic and/or electrical components (e.g., parts, subsystems, circuits, etc.) of CEW 420 and/or one or more payloads 440. Power supply 421 may provide electrical power. Providing electrical power may include providing a current at a voltage. Power supply 421 may be electrically coupled to processing unit 422, signal generator 423, and/or accountability module 470. In various embodiments, in response to a control interface of CEW 420 comprising electronic properties and/or components, power supply 421 may be electrically coupled to the control interface. In various embodiments, in response to trigger 418 comprising electronic properties or components, power supply 421 may be electrically coupled to trigger 418. Power supply 421 may provide an electrical current at a voltage. Electrical power from power supply 421 may be provided as a direct current ("DC"). Electrical power from power supply 421 may be provided as an alternating current ("AC"). Power supply 421 may include a battery. The energy of power supply 421 may be renewable or exhaustible, and/or replaceable. For example, power supply 421 may comprise one or more rechargeable or disposable batteries. In various embodiments, the energy from power supply 421 may be converted from one form (e.g., electrical, magnetic, thermal) to another form to perform the functions of a system.

Power supply 421 may provide energy for performing the functions of CEW 420. For example, power supply 421 may provide the electrical current to signal generator 423 that is provided through a target to impede locomotion of the target (e.g., via payload 440). Power supply 421 may provide the energy for a stimulus signal. Power supply 421 may provide the energy for other signals, including an ignition signal and/or an integration signal, as discussed further herein.

In various embodiments, processing unit 422 may comprise any circuitry, electrical components, electronic components, software, and/or the like configured to perform various operations and functions discussed herein. For example, processing unit 422 may comprise a processing unit described herein, a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing unit 422 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing unit 422 may include data buses, output ports, input ports, timers, memory, arithmetic units, and/or the like.

Processing unit 422 may be configured to provide and/or receive electrical signals whether digital and/or analog in form. Processing unit 422 may provide and/or receive digital information via a data bus using any protocol. Processing unit 422 may receive information, manipulate the received information, and provide the manipulated information. Processing unit 422 may store information and retrieve stored information. Information received, stored, and/or manipulated by processing unit 422 may be used to perform a function, control a function, and/or to perform an operation or execute a stored program.

Processing unit 422 may control the operation and/or function of other circuits and/or components of CEW 420. Processing unit 422 may receive status information regarding the operation of other components, perform calculations with respect to the status information, and provide commands (e.g., instructions) to one or more other components. Processing unit 422 may command another component to start operation, continue operation, alter operation, suspend operation, cease operation, or the like. Commands and/or status may be communicated between processing unit 422 and other circuits and/or components via any type of bus (e.g., SPI bus) including any type of data/address bus.

In various embodiments, processing unit 422 may be mechanically and/or electronically coupled to trigger 418. Processing unit 422 may be configured to detect an activation, actuation, depression, input, etc. (collectively, an "activation event") of trigger 418. In response to detecting the activation event, processing unit 422 may be configured to perform various operations and/or functions, as discussed further herein. Processing unit 422 may also include a sensor (e.g., a trigger sensor) attached to trigger 418 and configured to detect an activation event of trigger 418. The sensor may comprise any suitable sensor, such as a mechanical and/or electronic sensor capable of detecting an activation event in trigger 418 and reporting the activation event to processing unit 422.

In various embodiments, processing unit 422 may be mechanically and/or electronically coupled to a control interface of CEW 420. Processing unit 422 may be configured to detect an activation, actuation, depression, input, etc. (collectively, a "control event") of the control interface. In response to detecting the control event, processing unit 422 may be configured to perform various operations and/or functions, as discussed further herein. Processing unit 422 may also include a sensor (e.g., a control sensor) attached to the control interface and configured to detect a control event of the control interface. The sensor may comprise any suitable mechanical and/or electronic sensor capable of detecting a control event in the control interface and reporting the control event to processing unit 422.

In various embodiments, processing unit 422 may be electrically and/or electronically coupled to accountability module 470. Processing unit 422 may be configured to transmit or provide one or more instructions to accountability module 470, as discussed further herein. Processing unit 422 may be configured to perform various operations based on data or information receives from accountability module 470, as discussed further herein.

In various embodiments, processing unit 422 may be electrically and/or electronically coupled to power supply 421. Processing unit 422 may receive power from power supply 421. The power received from power supply 421 may be used by processing unit 422 to receive signals, process signals, and transmit signals to various other components in CEW 420. Processing unit 422 may use power from power supply 421 to detect an activation event of trigger 418, a control event of a control interface, or the like, and generate one or more control signals in response to the detected events. The control signal may be based on the control event and the activation event. The control signal may be an electrical signal.

In various embodiments, processing unit 422 may be electrically and/or electronically coupled to signal generator 423. Processing unit 422 may be configured to transmit or provide control signals to signal generator 423 in response to detecting an activation event of trigger 418. Multiple control signals may be provided from processing unit 422 to signal generator 423 in series. In response to receiving the control signal, signal generator 423 may be configured to perform various functions and/or operations, as discussed further herein.

In various embodiments, signal generator 423 may be configured to receive one or more control signals from processing unit 422. Signal generator 423 may provide an ignition signal to payload 440 based on the control signals. Signal generator 423 may be electrically and/or electronically coupled to processing unit 422 and/or payload 440.

Signal generator 423 may be electrically coupled to power supply 421. Signal generator 423 may use power received from power supply 421 to generate an ignition signal. For example, signal generator 423 may receive an electrical signal from power supply 421 that has first current and voltage values. Signal generator 423 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 423 may temporarily store power from power supply 421 and rely on the stored power entirely or in part to provide the ignition signal. Signal generator 423 may also rely on received power from power supply 421 entirely or in part to provide the ignition signal, without needing to temporarily store power.

Signal generator 423 may be controlled entirely or in part by processing unit 422. In various embodiments, signal generator 423 and processing unit 422 may be separate components (e.g., physically distinct and/or logically discrete). Signal generator 423 and processing unit 422 may be a single component. For example, a control circuit within housing 411 may at least include signal generator 423 and processing unit 422. The control circuit may also include other components and/or arrangements, including those that further integrate corresponding function of these elements into a single component or circuit, as well as those that further separate certain functions into separate components or circuits.

Signal generator 423 may be controlled by the control signals to generate an ignition signal having a predetermined current value or values. For example, signal generator 423 may include a current source. The control signal may be received by signal generator 423 to activate the current source at a current value of the current source. An additional control signal may be received to decrease a current of the current source. For example, signal generator 423 may include a pulse width modification circuit coupled between a current source and an output of the control circuit. A second control signal may be received by signal generator 423 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 423 may alternatively or additionally be employed, including those that apply a voltage over one or more different resistances to generate signals with different currents. In various embodiments, signal generator 423 may include a high-voltage module configured to deliver an electrical current having a high voltage. In various embodiments, signal generator 423 may include a low-voltage module configured to deliver an electrical current having a lower voltage, such as, for example, 2,000 volts.

Responsive to receipt of a signal indicating activation of trigger 418 (e.g., an activation event), a control circuit provides an ignition signal to payload 440. For example, signal generator 423 may provide an electrical signal as an ignition signal to payload 440 in response to receiving a control signal from processing unit 422. In various embodiments, the ignition signal may be separate and distinct from a stimulus signal. For example, a stimulus signal in CEW 420 may be provided to a different circuit within payload 440, relative to a circuit to which an ignition signal is provided. Signal generator 423 may be configured to generate a stimulus signal. In various embodiments, a second, separate signal generator, component, or circuit (not shown) within housing 411 may be configured to generate the stimulus signal. Signal generator 423 may also provide a ground signal path for payload 440, thereby completing a circuit for an electrical signal provided to payload 440 by signal generator 423. The ground signal path may also be provided to payload 440 by other elements in housing 411, including power supply 421.

In various embodiments, a payload 440 may comprise a propulsion system 445 and a plurality of projectiles, such as, for example, a first projectile 427 and a second projectile 428. Payload 440 may comprise any suitable or desired number of projectiles, such as, for example two projectiles, three projectiles, nine projectiles, twelve projectiles, eighteen projectiles, and/or any other desired number of projectiles. Further, housing 411 may be configured to receive any suitable or desired number of payloads 440, such as, for example, one payload, two payloads, three payloads, etc.

In various embodiments, propulsion system 445 may be coupled to, or in communication with, each projectile in payload 440. In various embodiments, payload 440 may comprise a plurality of propulsion systems 445, with each propulsion system 445 coupled to, or in communication with, one or more projectiles. Propulsion system 445 may comprise any device, propellant (e.g., air, gas, etc.), primer, or the like capable of providing a propulsion force in payload 440. The propulsion force may include an increase in pressure caused by rapidly expanding gas within an area or chamber. The propulsion force may be applied to projectiles 427, 428 in payload 440 to cause the deployment of projectiles 27, 28. Propulsion system 445 may provide the propulsion force in response to payload 440 receiving the ignition signal.

In various embodiments, the propulsion force may be directly applied to one or more projectiles 427, 428. For example, the propulsion force may be provided directly to first projectile 427 or second projectile 428. Propulsion system 445 may be in fluid communication with projectiles 427, 428 to provide the propulsion force. For example, the propulsion force from propulsion system 445 may travel within a housing or channel of payload 440 to one or more projectiles 427, 428. The propulsion force may travel via a manifold in payload 440.

In various embodiments, the propulsion force may be provided indirectly to first projectile 427 and/or second projectile 428. For example, the propulsion force may be provided to a secondary source of propellant within propulsion system 445. The propulsion force may launch the secondary source of propellant within propulsion system 445, causing the secondary source of propellant to release propellant. A force associated with the released propellant may in turn provide a force to one or more projectiles 427, 428. A force generated by a secondary source of propellant may cause projectiles 427, 428 to be deployed from the payload 440 and CEW 420.

In various embodiments, each projectile 427, 428 may comprise any suitable type of projectile. For example, one or more projectiles 427, 428 may be or include an electrode (e.g., an electrode dart). An electrode may include a spear portion, designed to pierce or attach proximate a tissue of a target in order to provide a conductive electrical path between the electrode and the tissue, as previously discussed herein. For example, projectiles 427, 428 may each include a respective electrode. Projectiles 427, 428 may be deployed from payload 440 at the same time or substantially the same time. Projectiles 427, 428 may be launched by a same propulsion force from a common propulsion system 445. Projectiles 427, 428 may also be launched by one or more propulsion forces received from one or more propulsion systems 445. Payload 440 may include an internal manifold configured to transfer a propulsion force from propulsion system 445 to one or more projectiles 427, 428.

In various embodiments, a control interface of CEW 420 may comprise, or be similar to, any control interface disclosed herein. For example, a control interface (e.g., a first control interface) may be configured to control selection of firing modes in CEW 420. Controlling selection of firing modes in CEW 420 may include disabling firing of CEW 420 (e.g., a safety mode, etc.), enabling firing of CEW 420 (e.g., an active mode, a firing mode, an escalation mode, etc.), controlling deployment of payload 440, and/or similar operations, as discussed further herein. As a further example, a control interface (e.g., a second control interface) may be configured to authenticate a user of CEW 420. In that respect, the control interface may be in electronic communication with accountability module 470, as discussed further herein.

A control interface may be located in any suitable location on or in housing 411. For example, a control interface may be coupled to an outer surface of housing 411. A control interface may be coupled to an outer surface of housing 411 proximate trigger 418 and/or guard 416. A control interface may be electrically, mechanically, and/or electronically coupled to processing unit 422. In various embodiments, in response to a control interface comprising electronic properties or components, a control interface may be electrically coupled to power supply 421. A control interface may receive power (e.g., electrical current) from power supply 421 to power the electronic properties or components.

A control interface may be electronically or mechanically coupled to trigger 418. For example, and as discussed further herein, a control interface may function as a safety mechanism. In response to the control interface being set to a "safety mode," CEW 420 may be unable to launch projectiles 427, 428 from payload 440. For example, the control interface may provide a signal (e.g., a control signal) to processing unit 422 instructing processing unit 422 to disable deployment of payload 440. As a further example, the control interface may electronically or mechanically prohibit trigger 418 from activating (e.g., prevent or disable a user from depressing trigger 418; prevent trigger 418 from launching a projectile 427, 428; etc.).

A control interface may comprise any suitable electronic or mechanical component capable of enabling selection of firing modes. For example, a control interface may comprise a fire mode selector switch, a safety switch, a safety catch, a rotating switch, a selection switch, a selective firing mechanism, and/or any other suitable mechanical control. As a further example, a control interface may comprise a slide, such as a handgun slide, a reciprocating slide, or the like. As a further example, a control interface may comprise a touch screen or similar electronic component. As a further example, a control interface may comprise a biometric reader configured to receive a biometric input from a user.

In various embodiments, accountability module 470 may be similar to, or have similar components with or similar features as, any other accountability module, system, or the like disclosed herein. For example, accountability module 470 may be similar to accountability module 370 (with brief reference to FIG. 3A), an MCEW accountability module, and/or accountability module 670 (with brief reference to FIGS. 6A and 6B).

In various embodiments, accountability module 470 may be configured to provide one or more accountability controls to CEW 420. Accountability module 470 may comprise one or more software and/or hardware components capable of providing the one or more accountability controls. The accountability controls may be configured to provide accountability to the operation and deployment of CEW 420. For example, the accountability controls may be configured to control access to and/or operation of CEW 420. The accountability controls may be configured to control access to, operation of, and/or deployment of projectiles or payloads 440 from CEW 420. The accountability controls may be configured to generate a record of events of CEW 420.

For example, and in accordance with various embodiments, accountability module 470 may be configured to provide one or more of an authentication control, an authorization control, a custody control, and/or a security analysis control. The authentication control may comprise one or more of the authentication controls previously disclosed herein. The authorization control may comprise one or more of the authorization controls previously disclosed herein. The custody control may comprise one or more of the custody controls previously disclosed herein. The security analysis control may comprise one or more of the security analysis controls previously disclosed herein.

In various embodiments, accountability module 470 may disable or enable one or more features, systems, or the like of CEW 420 based on the authentication control, authorization control, and/or system analysis control. Enabling or disabling one or more features, systems, or the like of CEW 420 may include software, electronic, and/or mechanical features configured to enable or disable the one or more features, systems, or the like.

For example, power from power supply 421 may be selectively provided or not provided to processing unit 422, signal generator 423, and/or any other component of CEW 420.

As a further example, signal generator 423 may be controlled or instructed based on a payload deployment permission, as discussed further herein. Signal generator 423 may be controlled (e.g., instructed) to provide or not provide ignition signals and/or stimulus signals. Signal generator 423 may be controlled (e.g., instructed) to provide a maximum number of ignition signals. Signal generator 423 may be controlled (e.g., instructed) to provide a maximum number of stimulus signals. Signal generator 423 may be controlled (e.g., instructed) to provide a stimulus signal for a determined amount of time. Signal generator 423 may also be controlled (e.g., instructed) to allow or prevent any other feature.

As a further example, payload 440 may be controlled or instructed to allow or prevent deployment of projectiles 427, 428 from payload 440. Payload 440 may be controlled (e.g., instructed) to allow or prevent deployment of a fixed number of projectiles 427, 428 from payload 440. Payload 440 may also be controlled (e.g., instructed) to allow or prevent any other feature.

As a further example, a mechanical feature may be used to disable or enable trigger 418 from activating.

In various embodiments, and with reference to FIGS. 5A-5D a payload platform 510 may comprise a modular conducted electrical weapon ("MCEW") 520. MCEW 520 may allow for the deployment of projectiles using a variety of platforms, systems, apparatuses, attachments, handles, and/or the like. MCEW 520 may be removably coupled to one or more platforms, systems, apparatuses, attachments, handles, and/or the like, as discussed further herein. In that respect, MCEW 520 may be movable and interoperable between platforms, systems, apparatuses, attachments, handles, and/or the like configured to receive MCEW 520. For example, MCEW 520 may be removably coupled to a weapon (e.g., a firearm, a weapon comprising a rail interface system, etc.), a dedicated launcher, a secondary housing, a vehicle, an unmanned vehicle (e.g., an unmanned aerial vehicle (UAV), an unmanned ground vehicle (UGV), an unmanned surface vessel (USV), etc.), a robot, or the like. As a further example, MCEW 520 may be removably coupled to a handle, a stock (e.g., a gunstock, a shoulder stock, a buttstock, etc.), a grip, an ergonomic handle, or the like. A stock may include any suitable or desired stock, such as, for example, a straight grip stock, a full pistol grip stock, a semi-grip stock, a thumbhole grip stock, an ergonomic grip stock, or the like.

In various embodiments, MCEW 520 may comprise a plurality of attachment points or ends such that MCEW 520 may removably couple to a plurality of platforms, systems, apparatuses, attachments, handles, and/or the like at a same time.

In various embodiments, MCEW 520 may comprise a rail interface system, an accessory rail, or the like (e.g., a MCEW rail interface), such as a Weaver rail, a Picatinny rail (e.g., MIL-STD-1913 rail, STANAG 2324 rail, etc.), or the like. The MCEW rail interface may be configured to interface with a corresponding rail interface system, accessory rail, or the like on a platform, system, apparatus, attachment, handle, and/or the like. The MCEW rail interface may be configured to interface with the corresponding rail interface system, accessory rail, or the like to removably couple the MCEW to the platform, system, apparatus, attachment, handle, and/or the like.

In various embodiments, MCEW 520 may comprise various modular components configured to enable customization and coupling to a variety of attachments and housings. For example, MCEW 520 may comprise a primary housing (e.g., a first housing, a modular housing, etc.) configured to provide one or more components capable of causing deployment of a projectile. The primary housing may be configured to receive one or more payloads from a second housing (e.g., a payload housing, a magazine housing, a buttstock housing, etc.). The second housing may be coupled to the primary housing. The primary housing may be configured to deploy one or more projectiles provided by the second housing. In various embodiments, a second housing may provide a first payload to the primary housing. The primary housing may receive and house the first payload in response to receiving the first payload from the second housing. The second housing may house a next payload while the primary housing houses the first payload. The primary housing may eject the first payload and receive the next payload from the second housing.

In various embodiments, a payload for MCEW 520 (e.g., a MCEW payload, a MCEW deployment unit, etc.) may include all the components needed to launch projectiles, provide a stimulus signal through the projectiles, and continue to provide the stimulus signal in response to the payload being ejected from MCEW 520. For example, a payload for MCEW 520 may include a power supply and a signal generator. The components of the payload may be held (e.g., contained) on or in a housing. The projectiles may be launched from the housing. The housing may be ejected from MCEW 520 to launch, serially, components of the payload. The power supply and the signal generator may be configured to provide the stimulus signal through the projectiles after deployment of the one or more projectiles and before, during, and after ejection of the payload from MCEW 520.

A payload for MCEW 520 may be launched in stages. For example, and in accordance with various embodiments, one or more projectiles of the payload may be launched in advance of ejection of the payload. The payload may include all components for launching one or more projectiles and/or providing one or more stimulus signals through a target. The projectiles of the payload may be wire-tethered to the housing of the payload.

In various embodiments, the projectiles may be launched toward a target, followed by the ejection of at least a portion of the housing of the payload or other portion of the payload. For example, the projectiles may be launched from the housing at (or during) a first launch. The housing, or a portion of the housing or the payload, may be ejected from MCEW 520 at (or during) a second launch.

In various embodiments, a first launch may include one or more projectiles deployed from the housing (e.g., the payload housing). A second launch (and subsequent launches) may include one or more additional projectiles deployed from the housing. A last launch may include ejection of the payload from the primary housing of MCEW 520.

In various embodiments, in response to the payload being ejected from the primary housing of MCEW 520, the primary housing may load (e.g., ready, move, position, etc.) a second payload. The second payload may similarly be deployed in stages (e.g., electrode deployment, housing ejection, etc.). The (first) payload and the second payload may be provided to the primary housing by a second housing.

In various embodiments, launch stages of MCEW 520 may be controlled at the primary housing of MCEW 520. For example, a trigger of the primary housing (or coupled to the primary housing, in communication with the primary housing, etc.) may be configured to cause deployment of one or more projectiles from the payload housed in the primary housing (e.g., the first launch).

A second trigger (e.g., a latch, a lever, a switch, etc.) may be configured to cause ejection of the payload from the primary housing (e.g., the second launch).

In various embodiments, a single activation of the second trigger may cause ejection of the payload and loading of a second payload. For example, in response to the single activation, the primary housing may eject the payload from the primary housing and retrieve and load the second payload from the second housing.

In various embodiments, the second trigger may be translated into a first position and a second position. During deployment of the projectiles, the second trigger may be in the first position. A first action of the second trigger into the second position may eject the payload. The first action of the second trigger into the second position may also enable loading (or at least partial loading) of the second payload. A second action of the second trigger back into the first position may load the second payload and enable deployment of subsequent projectiles from the second payload loaded in the primary housing.

In various embodiments, FIGS. 5A-5D depict an example sequence or stages of deploying projectiles and ejecting a payload from MCEW 520. Although FIGS. 5A-5D depict one exemplary deployment and ejection from a MCEW comprising a firearm-shaped handle, the principles illustrated by FIGS. 5A-5D and the accompanying description may also be applied to a deployment and ejection using a MCEW in any suitable arrangement and/or with any desired number of projectiles, sequence of deployment of projectiles, MCEW configuration, MCEW modular setup, or the like discussed herein.

Figure 5A:
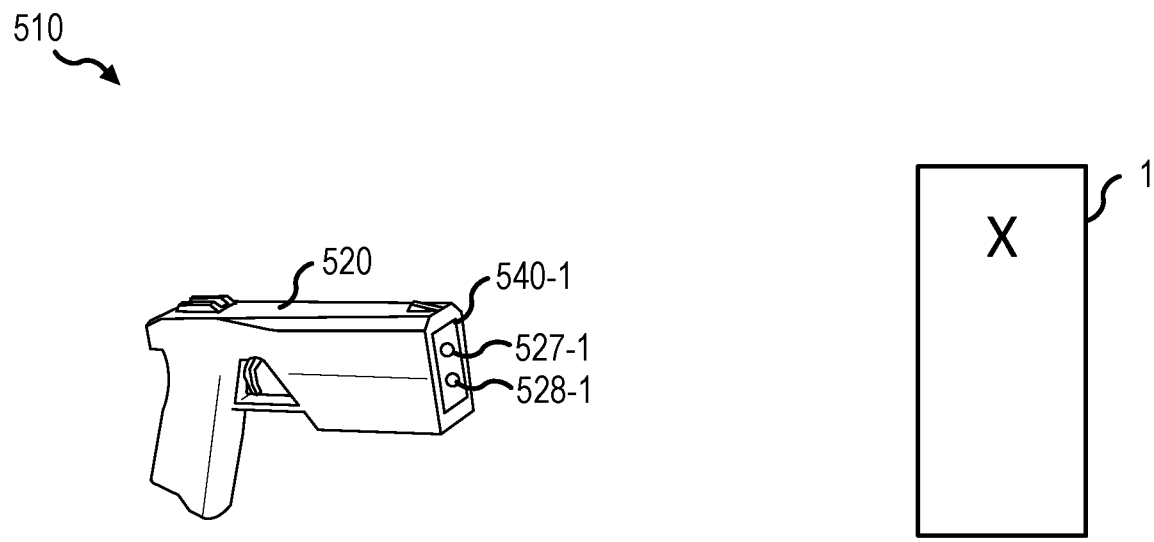
FIGS. 5A-5D illustrate stages of deploying projectiles and ejecting a payload from a payload platform including a modular conducted electrical weapon, in accordance with various embodiments.

With specific reference to FIG. 5A, MCEW 520 may be aimed or oriented toward a target 1. A first payload 540-1 may be loaded (e.g., housed) in MCEW 520 and ready for deployment. First payload 540-1 may comprise any suitable or desired number of projectiles, such as, for example, a first projectile 527-1 and a second projectile 528-1.

Figure 5B:
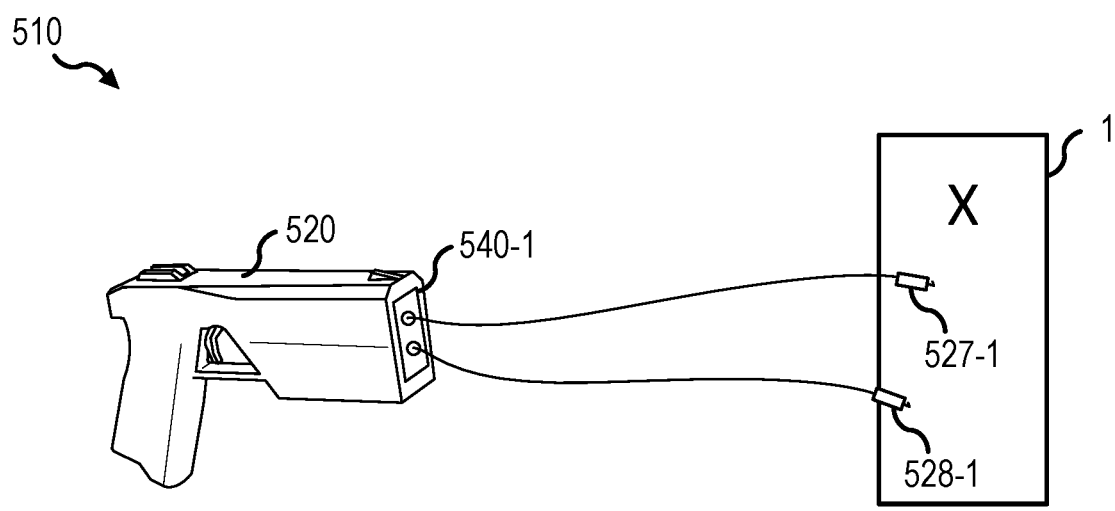

With specific reference to FIG. 5B, a first activation of MCEW 520 may be received to deploy one or both of first projectile 527-1 and second projectile 528-1 (e.g., a first launch). The first activation may be received responsive to an activation of a first trigger of MCEW 520. In response to receiving the first activation, MCEW 520 may deploy one or both of first projectile 527-1 and second projectile 528-1 toward target 1. In various embodiments, responsive to the first activation, a signal generator of first payload 540-1 may provide a stimulus signal through first projectile 527-1 and second projectile 528-1. The circuitry (e.g., power supply, signal generator, processing unit, etc.) of first payload 540-1 operates to provide the stimulus signal through target 1 via first projectile 527-1 and second projectile 528-1. A stimulus signal includes any type of electrical signal that impedes locomotion of a target, including a pulsed current. The circuitry of first payload 540-1 may provide one or more stimulus signals, as discussed further herein.

In one embodiment, as first projectile 527-1 and second projectile 528-1 travel toward target 1, wire tethers extend from first payload 540-1 and to first projectile 527-1 and second projectile 528-1, so that first projectile 527-1 and second projectile 528-1 remain electrically coupled to the first payload 540-1. In response to the first projectile 527-1 and second projectile 528-1 coupling to target 1 (e.g., electrically coupling, forming a circuit, etc.), the stimulus signal may travel from first payload 540-1, through the wire tethers, through first projectile 527-1 and second projectile 528-1, and through target 1.

Figure 5C:
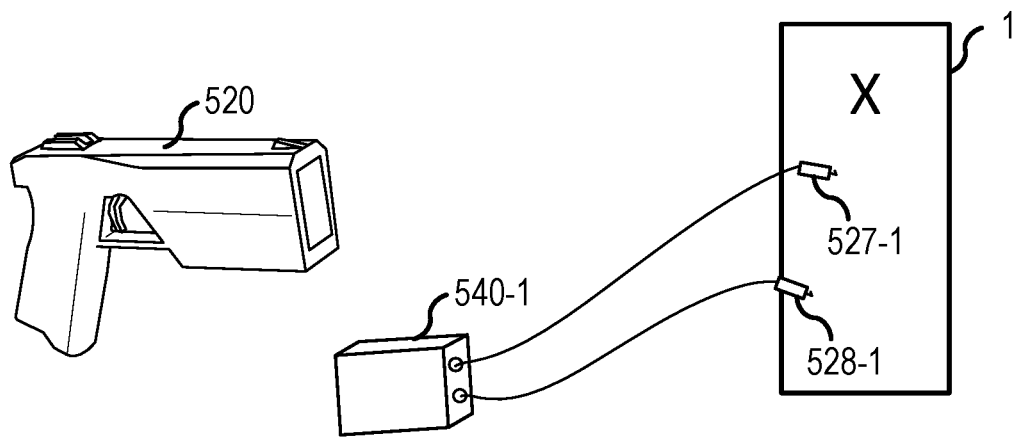

With specific reference to FIG. 5C, at some period after the launch of first projectile 527-1 and second projectile 528-1, first payload 540-1 may be ejected from MCEW 520 (e.g., a second launch). MCEW 520 may receive a second activation to eject first payload 540-1. The second activation may be received responsive to an activation of a second trigger of MCEW 520. In response to receiving the second activation, MCEW 520 may cause ejection of first payload 540-1. Ejecting first payload 540-1 may result in first payload 540-1 traveling away from MCEW 520 and/or toward target 1. First payload 540-1 may land on the ground or proximate surface within the length of the wire tethers coupled to target 1.

The circuitry of first payload 540-1 may continue to provide the stimulus signal to first projectile 527-1 and second projectile 528-1 before, during, and/or after ejection of first payload 540-1. In various embodiments, the circuitry of first payload 540-1 may be configured to continue to provide the stimulus signal for any suitable period of time, including a fixed period of time such as 5 seconds, 10 seconds, 30 seconds, etc.

Figure 5D:
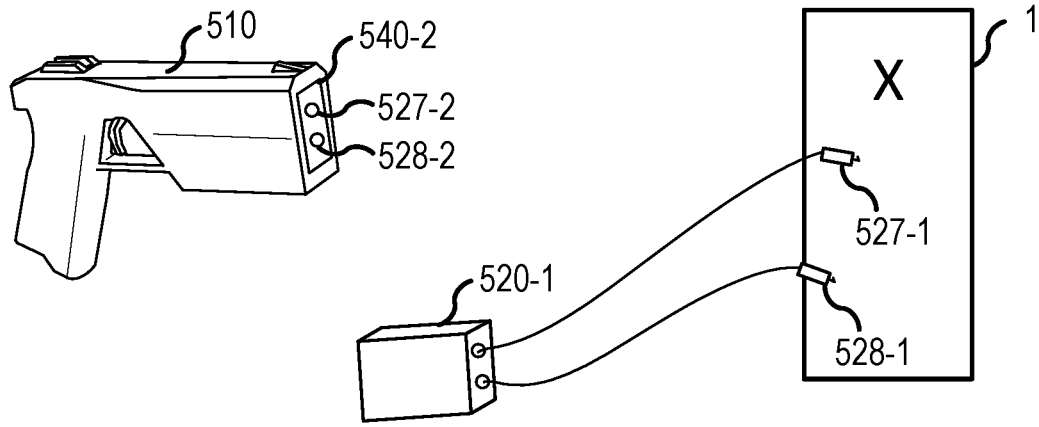

With specific reference to FIG. 5D, MCEW 520 may load (e.g., engage, prepare, ready to fire, etc.) a second payload 540-2. MCEW 520 may load second payload 540-2 in response to ejecting first payload 540-1. MCEW 520 may load second payload 540-2 in response to the second activation (e.g., activation of the second trigger). MCEW 520 may load second payload 540-2 in response to a third activation (e.g., a second activation of the second trigger). Second payload 540-2 may comprise any suitable or desired number of projectiles, such as, for example, a third projectile 527-2 and a fourth projectile 528-2.

In various embodiments, first payload 540-1 may continue to provide the stimulus signal to first projectile 527-1 and second projectile 528-1 before, during, and/or after loading of second payload 540-2, or for any other period of time as previously discussed. MCEW 520 may subsequently cause deployment of third projectile 527-2 and fourth projectile 528-2 (e.g., a third launch), a provision of a second stimulus signal from second payload 540-2 to third projectile 527-2 and fourth projectile 528-2, and ejection of second payload 540-2 from MCEW 520 (e.g., a fourth launch). The deployment of projectiles, provision of a stimulus signal, and ejection of a payload may be similar to the deployment of projectiles, provision of stimulus signal, and ejection of payload previously discussed with reference to first payload 540-1, first projectile 527-1, and second projectile 528-1.

In various embodiments, MCEW 520 may include an accountability module (not depicted). The MCEW accountability module may be similar to, or have similar components with or similar features as, any other accountability module, system, or the like disclosed herein. For example, accountability module 470 may be similar to accountability module 370 (with brief reference to FIG. 3A), accountability module 470 (with brief reference to FIG. 4), and/or accountability module 670 (with brief reference to FIGS. 6A and 6B)

In various embodiments, the MCEW accountability module may be configured to provide one or more accountability controls to MCEW 520. The MCEW accountability module may comprise one or more software and/or hardware components capable of providing the one or more accountability controls. The accountability controls may be configured to provide accountability to the operation and deployment of MCEW 520. For example, the accountability controls may be configured to control access to and/or operation of MCEW 520. The accountability controls may be configured to control access to, operation of, and/or deployment of projectiles or payloads 540 from MCEW 520. The accountability controls may be configured to generate a record of events of MCEW 520.

For example, and in accordance with various embodiments, the MCEW accountability module may be configured to provide one or more of an authentication control, an authorization control, a custody control, and/or a security analysis control. The authentication control may comprise one or more of the authentication controls previously disclosed herein. The authorization control may comprise one or more of the authorization controls previously disclosed herein. The custody control may comprise one or more of the custody controls previously disclosed herein. The security analysis control may comprise one or more of the security analysis controls previously disclosed herein.

In various embodiments, the MCEW accountability module may disable or enable one or more features, systems, or the like of MCEW 520 based on the authentication control, authorization control, and/or system analysis control. Enabling or disabling one or more features, systems, or the like of MCEW 520 may include software, electronic, and/or mechanical features configured to enable or disable the one or more features, systems, or the like.

For example, power from a MCEW power supply may be selectively provided or not provided to a MCEW processing unit, a MCEW signal generator, and/or any other component of MCEW 520.

As a further example, a MCEW signal generator may be controlled or instructed based on a payload deployment permission, as discussed further herein. The MCEW signal generator may be controlled (e.g., instructed) to provide or not provide ignition signals and/or stimulus signals. The MCEW signal generator may be controlled (e.g., instructed) to provide a maximum number of ignition signals. The MCEW signal generator may be controlled (e.g., instructed) to provide a maximum number of stimulus signals. The MCEW signal generator may be controlled (e.g., instructed) to provide a stimulus signal for a determined amount of time. The MCEW signal generator may also be controlled (e.g., instructed) to allow or prevent any other feature.

As a further example, a MCEW payload 540 may be controlled or instructed to allow or prevent deployment of projectiles 527, 528 from a MCEW payload 540. A MCEW payload 540 may be controlled (e.g., instructed) to allow or prevent deployment of a fixed number of projectiles 527, 528 from the MCEW payload 540. A MCEW payload 540 may also be controlled (e.g., instructed) to allow or prevent any other feature.

A MCEW 520 may be controlled or instructed to allow prevent deployment of a number of payload 540. For example, a MCEW 520 may be allowed to fire projectiles from first payload 540-1 and deploy first payload 540-1 from MCEW 520, but not be allowed to fire projectiles from second payload 540-2 and/or to deploy second payload 540-2 from MCEW 520.

As a further example, a mechanical feature may be used to disable or enable a MCEW trigger from activating.

Figure 6A:
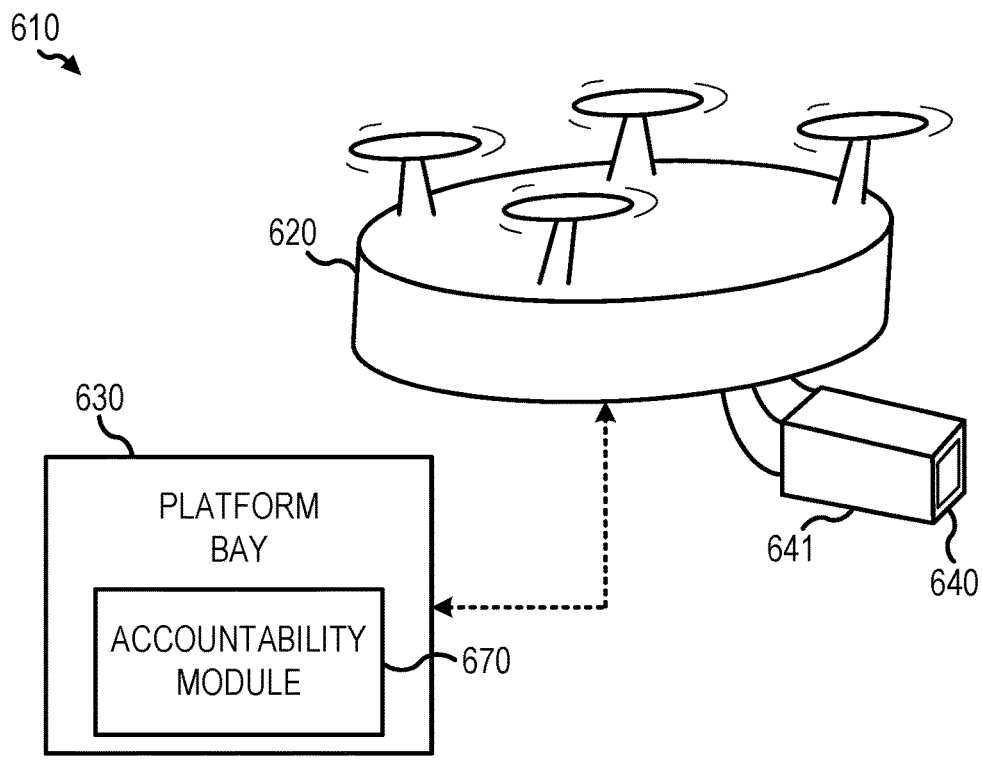
FIGS. 6A and 6B illustrate a payload platform including a remote vehicle, in accordance with various embodiments.
Figure 6B:
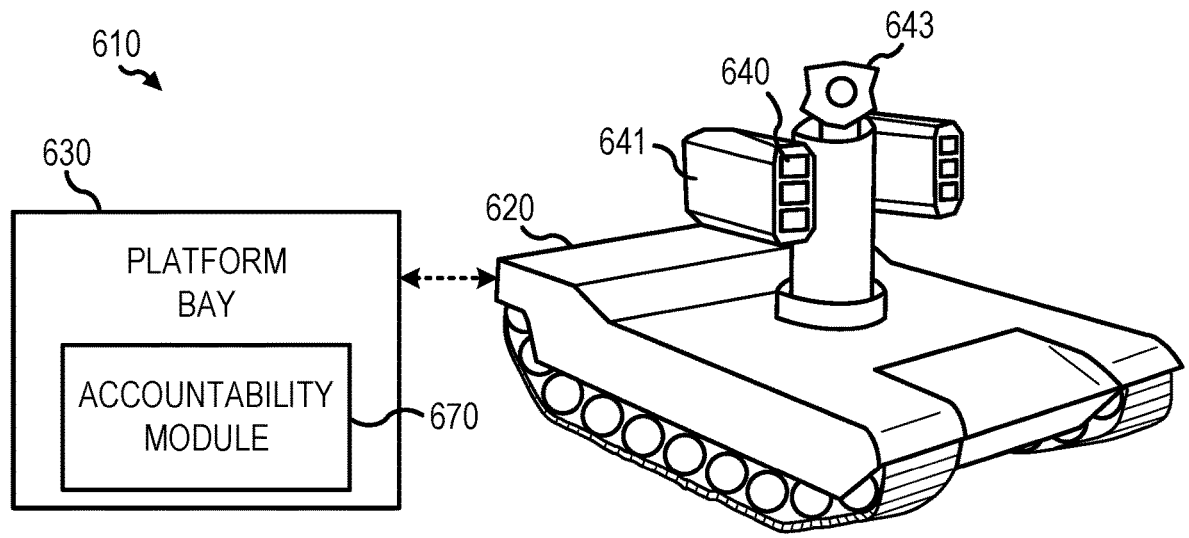

In various embodiments, and with reference to FIGS. 6A and 6B, a payload platform 610 may comprise a remote vehicle 620 (e.g., a first electronic device) and a platform bay 630 (e.g., a second electronic device). Remote vehicle 620 may comprise a computer-based system. For example, remote vehicle 620 may comprise hardware and/or software components. For example, remote vehicle 620 may comprise a processing unit, a communications unit, a memory, and/or any other suitable hardware components. Remote vehicle 620 may comprise software configured to manage and/or interact with the hardware components, such as, for example, an operating system, user interfaces, software applications, and/or the like.

In various embodiments, and with specific reference to FIG. 6A, remote vehicle 620 may comprise an unmanned aerial vehicle (UAV) capable of aerial travel, such as a drone. In that regard, remote vehicle 620 may comprise one or more propellers configured to convert rotational motion into thrust to enable remote vehicle 620 to aerially traverse. Each propeller may be coupled to a motor configured to apply a force to the propellers to cause each propeller to rotate. Remote vehicle 620 may comprise an autonomous vehicle or may be controlled remotely by an operator (e.g., user 5, remote operator 7, etc.). Remote vehicle 620 may comprise a payload launcher 641. Payload launcher 641 may be similar to any payload CEW, payload launcher, MCEW, or the like described herein and configured to deploy one or more payloads 640. Payload 640 may be similar to any payload or the like discussed herein.

In one embodiment, payload 640 may be inserted into a bay of payload launcher 641. Payload launcher 641 is mounted to remote vehicle 620. Payload launcher 641 may be mounted on remote vehicle 620 at any suitable location capable of deploying payload 640. Remote vehicle 620 may be maneuvered within range of a target. Payload launcher 641 and/or remote vehicle 620 may comprise one or more additional systems (e.g., camera, guidance, global positioning system (GPS), object detection, communications, speaker, microphone, etc.) used to control and/or direct the flight or movement of remote vehicle 620, bring remote vehicle 620 within range of the target, aim pay launcher 641 toward the target, and/or control launch of payload 640 (e.g., launch of projectiles from payload 640, deployment of payload 640, etc.). Once remote vehicle 620 brings payload launcher 641 within range of the target, launch of payload 640 (or projectiles from payload 640) may be initiated. In one embodiment, a user (e.g., user 5, remote operator 7, etc.) may initiate and/or confirm launch of payload 640 (e.g., launch of projectiles from payload 640, deployment of payload 640, etc.).

In various embodiments, and with specific reference to FIG. 6B, remote vehicle 620 may comprise an unmanned ground vehicle (UGV) capable of operating on land surfaces, such as, for example a car, a tank, or the like. For example, remote vehicle 620 may comprise a land traversal means such as, for example, wheels, tracks, or the like. Remote vehicle 620 may comprise an autonomous vehicle or may be controlled remotely by an operator (e.g., user 5, remote operator 7, etc.). Remote vehicle 620 may comprise a payload launcher 641 configured to deploy one or more payloads 640.

Payload launcher 641 may be mounted on an outer surface of remote vehicle 620. Payload launcher 641 may be mounted on remote vehicle 620 at any suitable location capable of deploying payload 640 (e.g., launch of projectiles from payload 640, deployment of payload 640, etc.). Payload launcher 641 and/or remote vehicle 620 may comprise one or more additional systems (e.g., camera, guidance, global positioning system (GPS), object detection, communications, speaker, microphone, etc.) used to control and/or direct the movement of remote vehicle 620, bring remote vehicle 620 within range of a target, aim payload launcher 641 toward a target, and/or control launch of payload 640 ((e.g., launch of projectiles from payload 640, deployment of payload 640, etc.). For example, as depicted in FIG. 6B, remote vehicle 620 may comprise a guidance system 643, which may include a camera and/or any other visual guidance components. In some embodiments, a user (e.g., user 5, remote operator 7, etc.) may initiate and/or confirm launch of payload 640 (e.g., launch of projectiles from payload 640, deployment of payload 640, etc.).

In various embodiments, and with reference to FIGS. 6A and 6B, a person of ordinary skill in the art will appreciate that a remote vehicle 620 may have a processor and a non-transitory computer-readable medium comprising computer-executable instructions that when executed by a processor, perform one or more actions. The non-transitory computer-readable medium may be a tangible, non-transitory memory configured to communicate with the processor. In one embodiment, non-transitory computer-readable medium contains computer-executable instructions that allow navigation of the remote vehicle. The medium may comprise instructions that when executed by a processor allow the reception and translation of electronic instructions from a remote user or system (e.g., platform bay 630, authorization system 150, user 5, remote operator 7, etc.). Yet in other embodiments, a medium may contain instructions that when executed by a processor allow for onboard systems to at least partially navigate the remote vehicle, either directly in response to a local user or responsive to one or more electronic inputs or outputs (e.g., sensor outputs). Those skilled in the art will appreciate that one or more processors and/or computer-readable mediums may be provided as part of any component recited herein.

In various embodiments, remote vehicle 620 may comprise one or more payload platform accessories. The payload platform accessories may be similar to any accessory, payload platform accessory, or the like disclosed herein.

In various embodiments, remote vehicle 620 may be configured to receive instruction, operations, or control from platform bay 630. Remote vehicle 620 may be in short-range electronic communication and/or long-range electronic communication with platform bay 630. Platform bay 630 may comprise a computer-based system. For example, platform bay 630 may comprise hardware and/or software components. For example, platform bay 630 may comprise a processing unit, a communications unit, a memory, and/or any other suitable hardware components. Platform bay 630 may comprise software configured to manage and/or interact with the hardware components, such as, for example, an operating system, user interfaces, software applications, and/or the like.

In various embodiments, platform bay 630 may comprise a receptacle, dock, bay, or the like configured to store and/or maintain remote vehicle 620 prior to operation of or deployment of remote vehicle 620. Platform bay 630 may be configured to provide power while remote vehicle 620 is docket to charge a power supply of remote vehicle 620.

In various embodiments, platform bay 630 may comprise (or be in electronic communication with) one or more interfaces configured to allow a user to access and operate remote vehicle 620. For example, platform bay 630 may include equipment (e.g., radio, electronic device, computing device, smart phone, etc.) to directly communicate with remote vehicle 620. Direct communication with remote vehicle 620 includes wireless communication. An example of direct communication between a user and remote vehicle 620 includes a device with a user interface (e.g., computing device, smart phone, tablet, vehicle controller, etc.). Interfaces of platform bay 630 may be operated by a user to send messages (e.g., signals, data, commands, information, etc.) from platform bay 630 to remote vehicle 620. Any wireless protocol may be used to implement direct communication between platform bay 630 and remote vehicle 620. In other embodiments, platform bay 630 may facilitate communications between a user (e.g., user 5, remote operator 7, etc.) or remote system (e.g., authorization system 150, remote control system 290, etc.). For example, platform bay 630 may be in electronic communication with network 101 (with brief reference to FIGS. 1 and 2) to facilitate communications. As a further example, platform bay 620 may be in short-range communication with an electronic device (e.g., smart phone, computing device, etc.) to facilitate communications.

In various embodiments, platform bay 630 may comprise an accountability module 670. Accountability module 670 may be similar to, or have similar components with or provide similar features as, any other accountability module, system, or the like disclosed herein. For example, accountability module 670 may be similar to accountability module 370 (with brief reference to FIG. 3A), accountability module 470 (with brief reference to FIG. 4), and/or an MCEW accountability module.

In various embodiments, accountability module 670 may be configured to provide one or more accountability controls to remote vehicle 620. Accountability module 670 may comprise one or more software and/or hardware components capable of providing the one or more accountability controls. The accountability controls may be configured to provide accountability to the operation and deployment of remote vehicle 620. For example, the accountability controls may be configured to control access to and/or operation of remote vehicle 620. The accountability controls may be configured to control access to, operation of, and/or deployment of projectiles or payloads 640 from payload launcher 641 of remote vehicle 620. The accountability controls may be configured to generate a record of events of remote vehicle 620.

For example, and in accordance with various embodiments, accountability module 670 may be configured to provide one or more of an authentication control, an authorization control, a custody control, and/or a security analysis control. The authentication control may comprise one or more of the authentication controls previously disclosed herein. The authorization control may comprise one or more of the authorization controls previously disclosed herein. The custody control may comprise one or more of the custody controls previously disclosed herein. The security analysis control may comprise one or more of the security analysis controls previously disclosed herein.

In various embodiments, accountability module 670 may disable or enable one or more features, systems, or the like of remote vehicle 620 based on the authentication control, authorization control, and/or system analysis control. Enabling or disabling one or more features, systems, or the like of remote vehicle 620 may include software, electronic, and/or mechanical features configured to enable or disable the one or more features, systems, or the like.

For example, operation and deployment of remote vehicle 620 from platform bay 630 may be prevented (mechanically or electronically) based on an authentication control, authorization control, and/or security analysis control.

As a further example, automated controls (e.g., autonomous flight, autonomous movement, object detection, etc.) may be enabled or disabled based on an authorization control.

As a further example, a signal generator of remote vehicle 620, payload launcher 641, or payload 640 may be controlled or instructed based on a payload deployment permission, as discussed further herein. The signal generator may be controlled (e.g., instructed) to provide or not provide ignition signals and/or stimulus signals. The signal may be controlled (e.g., instructed) to provide a maximum number of ignition signals. The signal generator may be controlled (e.g., instructed) to provide a maximum number of stimulus signals. The signal generator may be controlled (e.g., instructed) to provide a stimulus signal for a determined amount of time. The signal generator may also be controlled (e.g., instructed) to allow or prevent any other feature.

As a further example, vehicle 620, payload launcher 641, or payload 640 may be controlled or instructed to allow or prevent deployment of projectiles from payload 640. Remote vehicle 620, payload launcher 641, or payload 640 may be controlled (e.g., instructed) to allow or prevent deployment of a fixed number of projectiles from payload 6640. Remote vehicle 620, payload launcher 641, or payload 640 may also be controlled (e.g., instructed) to allow or prevent any other feature.

Remote vehicle 620 or payload launcher 641 may be controlled or instructed to allow prevent deployment of a number of payload 640. For example, remote vehicle 620 or payload launcher 641 may be allowed to fire projectiles from a first payload 640 and deploy the first payload 640 from payload launcher 641, but not be allowed to fire projectiles from a second payload 640 and/or to deploy the second payload from payload launcher 641.

In various embodiments, the decision to launch projectiles and/or payloads 640 from remote vehicle 620, as discussed further herein, is received from a human operator. In that respect, although a remote vehicle carrying a payload may be at least partially autonomous, the decision to launch electrodes may involve human intervention.

Referring now to FIGS. 7-10, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 7-10, but also to the various systems, devices, and other components as described above with reference to FIGS. 1-6B (or below, with reference to FIGS. 11 and 12).

Figure 7:
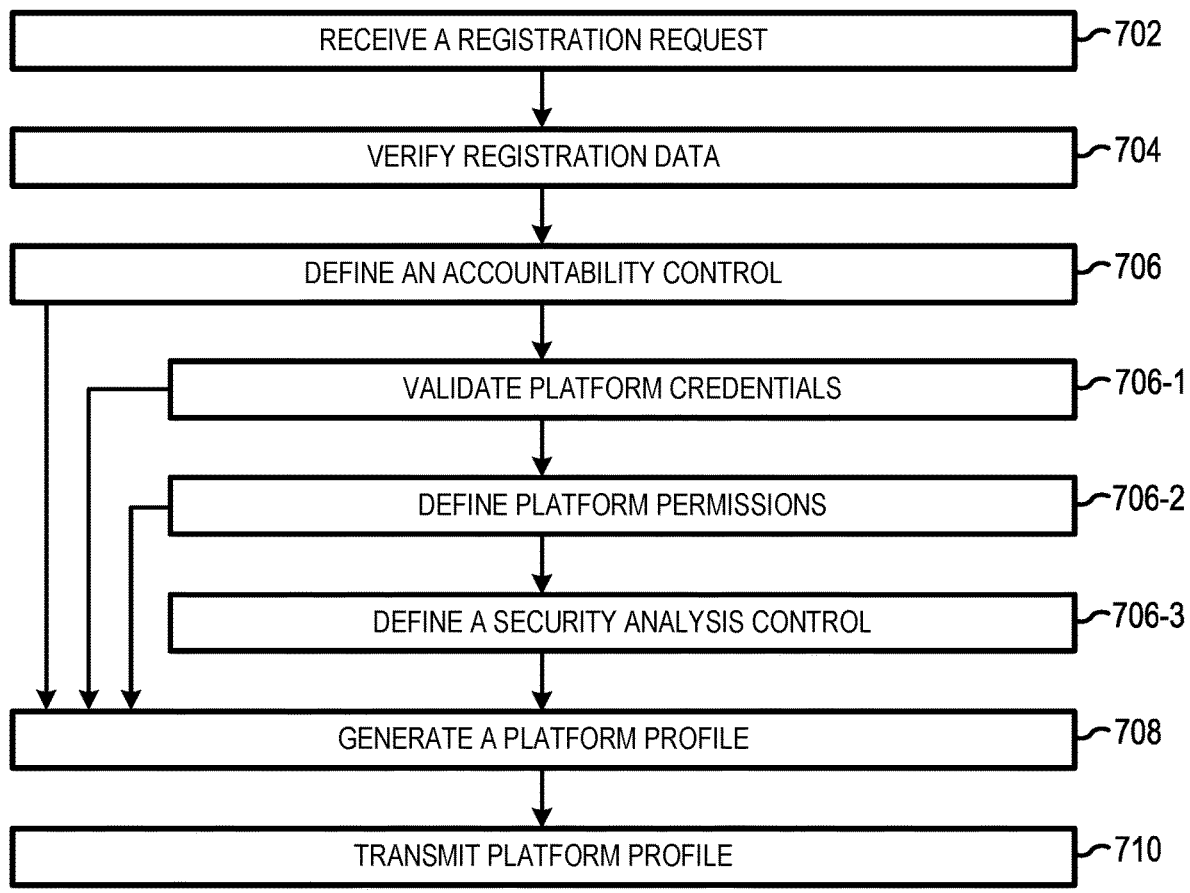
FIG. 7 illustrates a process flow for a method of registering with an accountability control system, in accordance with various embodiments.

In various embodiments, and with specific reference to FIG. 7, a method 701 for registering with an accountability control system is disclosed. A user, agency (e.g., security agency, law enforcement agency, private agency, public agency, military, etc.), device, or system may register with the accountability control system to receive access and authorizations to use a payload platform, as discussed further herein.

In various embodiments, the system may receive a registration request (step 702). The registration request may be received by accountability control system 100 and/or authorization system 150. The registration request may be transmitted to the system based on any suitable or desired event or process. For example, a registration request may be generated and transmitted in response to a user purchasing a payload platform, registering a payload platform, installing a payload platform as part of a home security system, or the like. As a further example, a registration request may be generated and transmitted by an agency in response to receiving or acquiring a payload platform, registering a payload platform, adding a new user to access a payload platform, and/or the like. In other embodiments, a registration request may be generated and transmitted responsive to any other event or process wherein registration with an accountability control system or a payload platform is desired.

The registration request may comprise any data identifying a user, device, agency, or the like submitting the registration request (e.g., registration data). For example, the registration request may comprise user identifying information (e.g., name, address, etc.). As a further example, the registration request may comprise agency identifying information (e.g., an agency identifier, an agency name, etc.). As a further example, the registration request may comprise a payload platform identifier identifying one or more payload platforms to be registered. As a further example, the registration request may comprise training information, certificates, or the like indicating that a user is trained in a given payload platform, or operations of a payload platform. As a further example, the registration request may comprise one or more accountability controls desired to be assigned to the user, device, agency, or the like. As a further example, wherein the user desires to access the payload platform via a biometric authentication key, the registration request may comprise a biometric input. The registration request may also comprise any other desired or similar data.

In various embodiments, the system may verify registration data from the registration request (step 704). Accountability control system 100 and/or authorization system 150 may be configured to verify the registration data from the registration request. The registration data may be verified using any technology or process. The registration data may be verified using internal resources and/or external resources or services. For example, user identifying information of the registration data may be verified to confirm the identity of the user. As a further example, agency identifying information of the registration data may be verified to confirm the identity of the agency. As a further example, training information, certificates, or the like may be verified to confirm the training information, certificates, or the like are accurate and up to date. Any other registration data may be verified, in accordance with other embodiments. In some embodiments, third-party identity verification services may be used to verify registration data.

In various embodiments, the system may define an accountability control (step 706). Accountability control system 100 and/or authorization system 150 may be configured to define the accountability control. The accountability control may be defined based on the registration request. For example, the accountability control may be defined based on the payload platform identifier, the selected accountability controls, the training information or certificates, and/or the like. The accountability control may define a permission level (comprising one or more accountability controls) to be provided to a payload platform. The accountability control may define one or more accountability controls to be provided to a payload platform.

For example, and in accordance with various embodiments, defining an accountability control may include validating platform credentials (step 706-1). Accountability control system 100 and/or authorization system 150 may be configured to generate and validate the platform credentials. The platform credentials may be used to access a payload platform (e.g., an authentication control) and/or may be correlated to one or more platform permissions. The platform credentials may be based on the registration request and/or the payload platform identifier. The platform credentials may comprise or define one or more of an authentication type and/or an authentication continuum. For example, the platform credentials may comprise or define one or more of a physical authentication key, a virtual authentication key, and/or a biometric authentication key, as discussed further herein. The authentication continuum may comprise or define one or more of a continuous authentication, a time-based authentication, a situation-based authentication, a one-time authentication, no authentication, or the like, as discussed further herein. The platform credentials may comprise a user identifier, platform credential identifier, or the like configured to group the platform credentials under a unique identifier.

For example, and in accordance with various embodiments, defining an accountability control may include defining platform permissions (step 706-2). Accountability control system 100 and/or authorization system 150 may be configured to define the platform permissions. The platform permissions may be used to control or delegate operations of a payload platform (e.g., an authorization control) and/or may be correlated to a platform credential. The platform permissions may be based on the registration request and/or the payload platform identifier. The platform permissions may comprise or define one or more authorization controls. For example, the platform permissions may comprise or define one or more of a platform permission, an access permission, an operate permission, an accessory access permission, a payload deployment permission, a permission level, a remote operator requirement, and/or the like, as discussed further herein.

For example, and in accordance with various embodiments, defining an accountability control may include defining a security analysis control (step 706-3). Accountability control system 100 and/or authorization system 150 may be configured to define the security analysis control. The security analysis control may be used to at least partially ensure compatibility of components of a payload platform. The security analysis control may also be used to determine whether a component of the payload platform was compromised. The security analysis control may be based on the registration request and/or the payload platform identifier. The security analysis control may comprise or define one or more of a compatibility control (e.g., whether a payload is compatible with a platform or payload launcher), a security check (e.g., whether a component of the payload platform was compromised), a device fingerprint control, and/or the like, as discussed further herein.

In various embodiments, the accountability control(s) may also be defined or changed after registration. Such as, for example, by modifying a platform profile.

In various embodiments, the system may generate a platform profile (step 708). Accountability control system 100 and/or authorization system 150 may be configured to generate the platform profile. The platform profile may be generated to comprise one or more of the registration data, the one or more accountability controls (e.g., the platform credentials, the platform permission, the security analysis control, etc.), and/or the like. The platform profile may comprise a unique identifier such as a platform profile identifier, a platform credential identifier, or the like.

In various embodiments, the system may generate a plurality of platform profiles configured to be stored on different systems or devices of an accountability control system. For example, the system may generate a local platform profile and a remote platform profile. The local platform profile may be stored on a payload platform. The remote platform profile may be stored remote, such as, for example, on authorization system 150. The local platform profile may comprise different data than the remote platform profile. For example, the local platform profile may comprise a "partial" profile, such as, for example, one or more accountability controls. The remote platform profile may comprise a "full" profile, such as, for example, one or more of the registration data, the one or more accountability controls (e.g., the platform credentials, the platform permission, the security analysis control, etc.), and/or the like.

The local platform profile and the remote platform profile may comprise a same unique identifier to indicate the two profiles are linked or related. The local platform profile and/or the remote platform profile may also each comprise a sub-identifier (e.g., a local platform profile identifier, a remote platform profile identifier, etc.) correlated to indicate the two or more profiles are linked or related.

In various embodiments, the system may transmit the platform profile (step 710). Accountability control system 100 and/or authorization system 150 may be configured to transmit the platform profile. The platform profile may be stored on any device or system in accountability control system 100. For example, the platform profile may be stored in a database of a payload platform, a database of authorization system 150, remote storage of network 101, and/or the like. In embodiments wherein separate local profiles and remote profiles are generated, the system may transmit the local profile to a payload platform and/or the remote profile to an authorization system.

In various embodiments, the accountability control(s) may also be defined or changed after registration, such as, for example, by modifying a platform profile. The platform profile may be modified via a user request. For example, an administrator or other user or personnel may access the database of the payload platform, the database of authorization system 150, the remote storage of network 101, and/or the like to modify the one or more platform profiles. Modifying a platform profile may also include updating a platform profile, such as, for example, by submitting new training certificates, updating user information, or the like.

Figure 8:
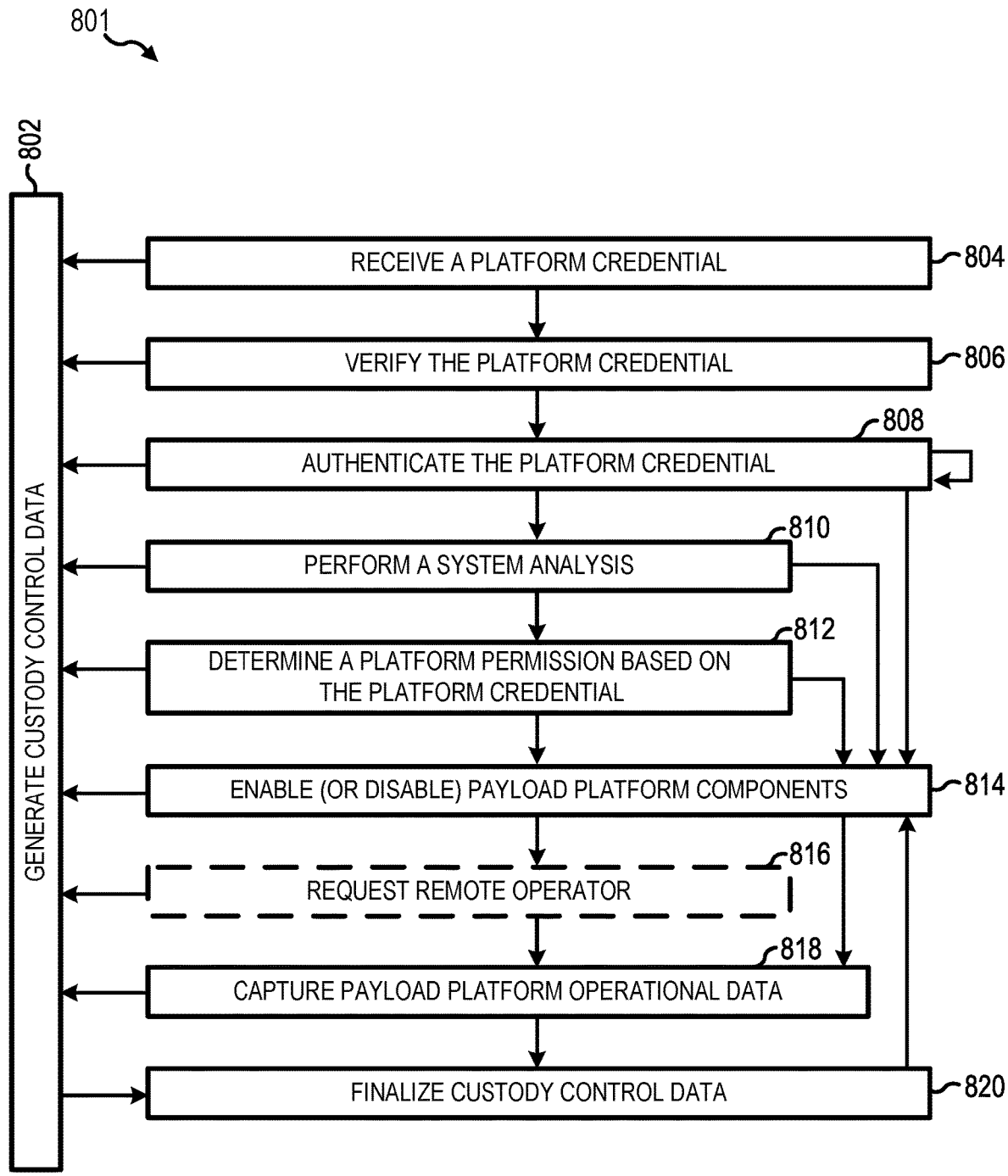
FIG. 8 illustrates a process flow for a method of providing an accountability control on a payload platform, in accordance with various embodiments.

In various embodiments, and with specific reference to FIG. 8, a method 801 for providing an accountability control on a payload platform is disclosed. The accountability controls may be configured to provide accountability to the operation and deployment of payload platforms. For example, the accountability controls may be configured to control access to and/or operation of the payload platform.

In various embodiments, one or more of the steps of method 801 may cause a system to generate custody control data (step 802). For example, any system or device of an accountability control system may generate the custody control data including payload platform 110, authorization system 150, and/or remote control system 290. The custody control data may be generated based on one or more custody controls. The custody controls may comprise one or more controls configured to capture and record a chain of custody of events (e.g., processes, operations, commands, states, controls, etc.). For example, custody control be configured to record, or cause recordation of, data for each input, action, event, deployment, etc. in the accountability control system.

The custody control data may be generated to include a timestamp. The timestamp may include any information indicating a date, a time, or the like, and may be generated using any suitable process, as disclosed herein. The custody control data may also be generated to comprise one or more correlation data correlating the user, device, or system responsible for the input, action, event, deployment, etc. The correlation data may include an identifier of the user, device, or system, such as, for example, a user identifier, a platform identifier, a system identifier, a MAC address, an IP address, or the like. The custody control data may also comprise any other data helpful or needed to record a chain of custody of events in the system.

In various embodiments, the system may receive a platform credential (step 804). Accountability control system 100 and/or payload platform 110 may be configured to receive the platform credential. The platform credential may be received as an authentication input from a user. For example, the user may input the authentication input into the payload platform based on an authentication type. The authentication input may comprise one or more of a physical authentication key, a virtual authentication key, and/or a biometric authentication key. The platform credential may be received from a third-party system, such as a home security system, a home monitoring system, a private security system, a public security system, or the like. For example, the third-party system may transmit the platform credential in response to an event, automated event, or the like (e.g., home alarm activates, security system activates, etc.). In various embodiments, the system may generate custody control data responsive to step 804.

In various embodiments, the system may verify the platform credential (step 806). Accountability control system 100 and/or payload platform 110 may be configured to verify the platform credential. The platform credential may be verified using any suitable process. For example, the platform credential may be verified to ensure that the authentication type of the authentication input matches an enabled authentication type (e.g., based on the platform profile, hardware and/or software capabilities of the payload platform, etc.). In various embodiments, the system may generate custody control data responsive to step 806.

In various embodiments, the system may authenticate the platform credential (step 808). Accountability control system 100 and/or authorization system 150 may be configured to authenticate the platform credential. The system may authenticate the platform credential using any suitable process. For example, the system may authenticate the platform credential by comparing the platform credential to stored data from a payload platform. In response to determining a match, the system may authenticate the platform credential. In response to determining no matching data, the system may fail to authenticate the platform credential. In various embodiments, the system may generate custody control data responsive to step 808.

In various embodiments, the system may enable (or disable) payload platform components (step 814) based on the authentication. For example, the system may grant at least partial access to a payload platform in response to authenticating the platform credential. For example, the system may grant access to one or more payload platform accessories, access to operate or fly a payload platform, or the like. Granting at least partial access to the payload platform may be based on the platform profile matching the platform credentials (e.g., based on the authorization controls). The system may enable one or more components to enable the at least partial access. In various embodiments, the system may generate custody control data responsive to step 814.

As a further example, in response to a failed authentication (or repeated failed authentications) the system may disable one or more, or all, components of a payload platform, as discussed further herein. In various embodiments, the system may generate custody control data responsive to disabling payload platform components (e.g., step 814).

In various embodiments, the system may continue to re-authenticate the platform credential through method 801. For example, the system may continue to re-authenticate based on the authentication continuum from the platform profile matching the platform credentials. The authentication continuum may comprise or define one or more of a continuous authentication, a time-based authentication, a situation-based authentication, a one-time authentication, no authentication, or the like, as discussed further herein. In response to re-authenticating the platform credential, the system may generate custody control data.

In response to a re-authentication failing, the system may disable one or more components of the payload platform, as previously discussed. In response to failing the re-authentication of the platform credential, the system may generate custody control data.

In various embodiments, the system may perform a system analysis (step 810). Accountability control system 100 and/or payload platform 110 may perform the system analysis. The system analysis may be performed using any suitable process. For example, a system analysis control may be retrieved or determined based on the platform profile matching the platform credentials. The system may perform the system analysis control, as discussed further herein. In various embodiments, the system may generate custody control data responsive to successfully performing the system analysis.

In various embodiments, the system may enable (or disable) payload platform components (step 814) based on the system analysis. For example, the system may grant at least partial access to a payload platform in response to successfully performing the system analysis. For example, the system may grant access to one or more payload platform accessories, access to operate or fly a payload platform, or the like. Granting at least partial access to the payload platform may be based on the platform profile matching the platform credentials (e.g., based on the authorization controls). The system may enable one or more components to enable the at least partial access. In various embodiments, the system may generate custody control data responsive to step 814.

As a further example, in response to a failed system analysis (or repeated failed system analyses) the system may disable one or more, or all, components of a payload platform, as discussed further herein. In various embodiments, the system may generate custody control data responsive to disabling payload platform components (e.g., step 814).

In various embodiments, the system may determine a platform permission based on the platform credential (step 812). Accountability control system 100 and/or payload platform 110 may be configured to determine the platform permission. For example, the system may determine the platform permission from the platform profile matching the platform credential. In various embodiments, the system may generate custody control data responsive to step 812.

In various embodiments, the system may enable (or disable) payload platform components (step 814) based on the platform permission. Accountability control system 100 and/or payload platform 110 may be configured to enable (or disable) the payload platform components. The system may enable components of payload platform that are authorized by the platform permission. The system may disable (or not enable) components of payload platform that are not authorized by the platform permission. For example, in response to an accessory access permission of the platform permission granting access to a flashlight accessory but disabling access to a camera accessory, the system may enable one or more components of the payload platform necessary for the flashlight accessory to function while disabling (or not enabling) one or more components of the payload platform necessary for the camera accessory. As a further example, in response to a platform permission comprising an operate permission but not a payload deployment permission, the system may enable one or more components of the payload platform necessary to operate the payload platform while disabling (or not enabling) one or more components of the payload platform necessary to deploy (or cause deployment of) the payload of a payload platform.

In various embodiments, the system may generate custody control data responsive to enabling or disabling components of the payload platform based on the platform permission.

In various embodiments, the system may request a remote operator (step 816). Accountability control system 100 and/or payload platform 110 may be configured to request the remote operator from remote control system 290. The system may request a remote operator based on an input from a user, system, device, or the like. The system may request a remote operator based on a platform permission (e.g., a platform permission requiring a remote operator for one or more features or components of the payload platform). The system may request a remote operator using any process. For example, the system may request a remote operator based on the process disclosed in method 1001, with brief reference to FIG. 10 (and as discussed further herein). In various embodiments, the system may generate custody control data responsive to step 816.

In various embodiments, the system may capture payload platform operational data (step 818). Accountability control system 100 and/or payload platform 110 may be configured to capture the payload platform operational data. For example, in response to the system enabling (or disabling) payload platform components, the user, system, device or like may operate the payload platform. For example, the user, system, device, or the like may operate accessories of the payload platform, operate or fly the payload platform if the payload platform comprises a remote vehicle, deploy payloads from the payload platform, deploy projectiles and/or payloads from the payload platform, and/or the like (collectively, payload platform operations). In various embodiments, the system may generate custody control data responsive to one or more of the payload platform operations.

In various embodiments, the system may finalize the custody control data (step 820). Accountability control system 100 and/or payload platform 110 may be configured to finalize the custody control data. For example, the system may finalize the custody control data in response to a user, system, device, or the like completing operations of the payload platform (e.g., by powering off the payload platform, by redocking the payload platform, by logging out of the payload platform, etc.). In response to operations of the payload platform being complete, the system may finalize the custody control data. Finalizing the custody control data may include generating a data packet comprising all of the custody control data generated during method 801. In various embodiments, the system may locally store the finalized custody control data (e.g., in local memory on payload platform 110). In various embodiments, the system may transmit the finalized custody control data for remote storage (e.g., in authorization system 150, an evidence management system, etc.).

Figure 9:
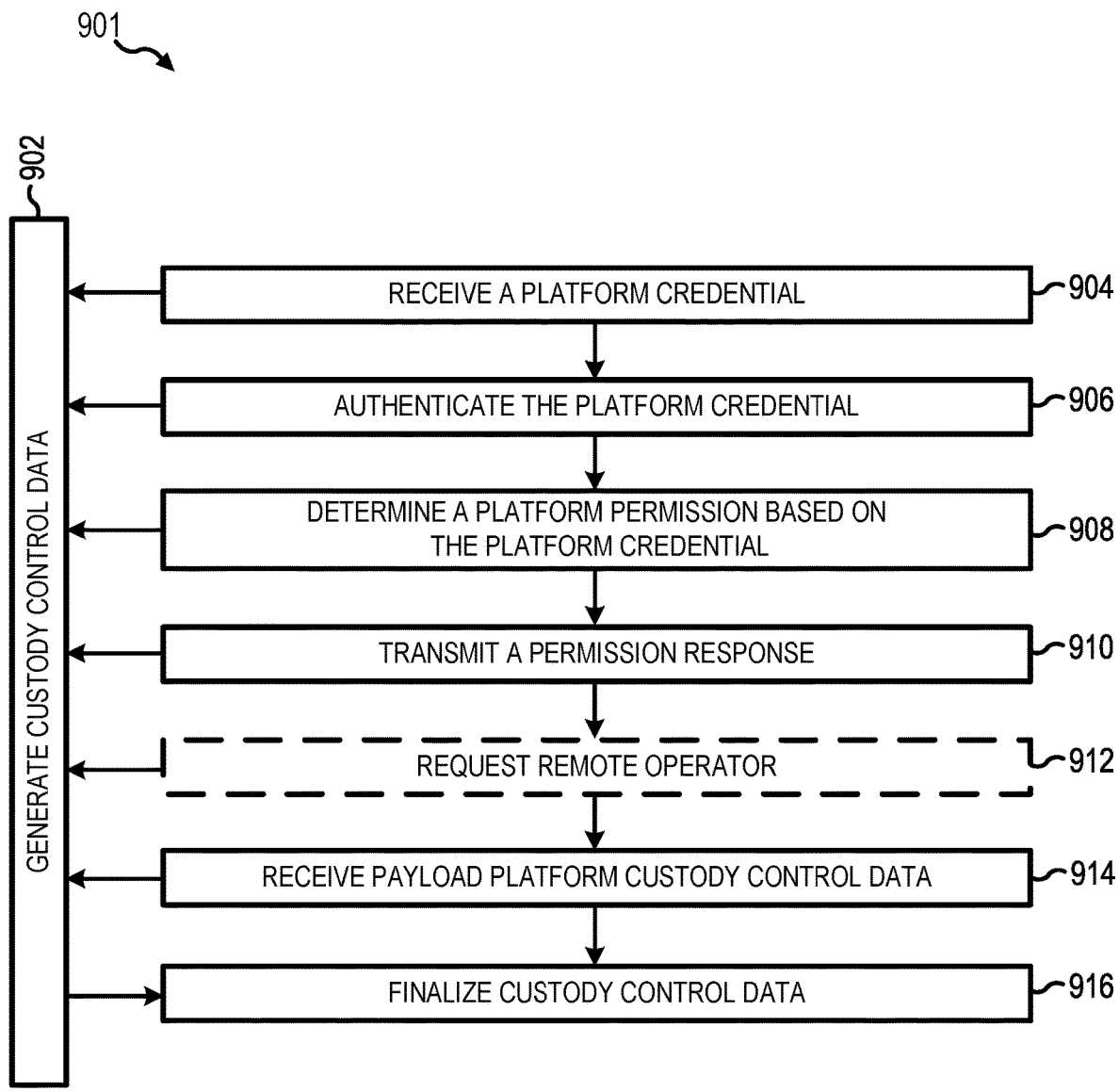
FIG. 9 illustrates a process flow for a method of providing an accountability control on a payload platform via a remote system, in accordance with various embodiments.

In various embodiments, and with specific reference to FIG. 9, a method 901 for providing an accountability control on a payload platform via a remote system is disclosed. The accountability controls may be configured to provide accountability to the operation and deployment of payload platforms. For example, the accountability controls may be configured to control access to and/or operation of the payload platform.

In various embodiments, one or more of the steps of method 901 may cause a system to generate custody control data (step 902). For example, any system or device of an accountability control system may generate the custody control data including payload platform 110, authorization system 150, and/or remote control system 290. The custody control data may be generated based on one or more custody controls. The custody controls may comprise one or more controls configured to capture and record a chain of custody of events (e.g., processes, operations, commands, states, controls, etc.). For example, custody control be configured to record, or cause recordation of, data for each input, action, event, deployment, etc. in the accountability control system.

The custody control data may be generated to include a timestamp. The timestamp may include any information (e.g., date, time, etc.) and may be generated using any suitable process, as disclosed herein. The custody control data may also be generated to comprise one or more correlation data correlating the user, device, or system responsible for the input, action, event, deployment, etc. The correlation data may include an identifier of the user, device, or system, such as, for example, a user identifier, a platform identifier, a system identifier, a MAC address, and IP address, or the like. The custody control data may also comprise any other data helpful or needed to record a chain of custody of events in the system.

In various embodiments, the system may receive a platform credential (step 904). Accountability control system 100 and/or authorization system 150 may be configured to receive the platform credential. The platform credential may be received as an authentication input from a user. For example, the user may input the authentication input into a payload platform based on an authentication type. The authentication input may comprise one or more of a physical authentication key, a virtual authentication key, and/or a biometric authentication key. The platform credential may be received from a third-party system, such as a home security system, a home monitoring system, a private security system, a public security system, or the like. For example, the third-party system may transmit the platform credential response to an event, automated event, or the like (e.g., home alarm activates, security system activates, etc.). The payload platform may transmit the platform credential to the authorization system. In various embodiments, the system may generate custody control data responsive to receiving the platform credential.

In various embodiments, the system may authenticate the platform credential (step 906). Accountability control system 100, payload platform 110, and/or authorization system 150 may be configured to authenticate the platform credential. The platform or system that authenticates the platform credential may be based on a feature or setting of payload platform 110, an accountability control, or the like.

For example, in a local authentication, the payload platform may perform the steps of authenticating the platform credential. In response to authenticating the platform credential, the payload platform may transmit the platform credential to the authorization system. As a further example, in a remote authentication, the payload platform may transmit the platform credential to the authorization server. The authorization sever may perform the steps of authenticating the platform credential. In response to authenticating the platform credential, the authorization server may transmit an authentication response indicating whether authentication was successful back to the payload platform.

The system may authenticate the platform credential using any suitable process. For example, the system may authenticate the platform credential by comparing the platform credential to stored data (e.g., local data on the payload platform or remote data on the authorization system). In response to determining a match, the system may authenticate the platform credential. In response to determining no matching data, the system may fail to authenticate the platform credential. In various embodiments, the system may generate custody control data responsive to step 906.

In various embodiments, a payload platform may enable (or disable) payload platform components based on the authentication (e.g., as discussed in step 808, with brief reference to FIG. 8). For example, the payload platform may grant at least partial access to the payload platform in response to authenticating the platform credential. For example, the system may grant access to one or more payload platform accessories, access to operate or fly the payload platform, or the like. Granting at least partial access to the payload platform may be based on the platform profile matching the platform credentials (e.g., based on the authorization controls). The system may enable one or more components to enable the at least partial access. In various embodiments, the system may generate custody control data responsive to enabling payload platform components.

As a further example, in response to a failed authentication (or repeated failed authentications) the payload platform may disable one or more, or all, components of the payload platform, as discussed further herein. In various embodiments, the system may generate custody control data responsive to disabling payload platform components.

In various embodiments, the system may continue to re-authenticate the platform credential through method 901. For example, the system may continue to re-authenticate based on the authentication continuum from the platform profile matching the platform credentials. The authentication continuum may comprise or define one or more of a continuous authentication, a time-based authentication, a situation-based authentication, a one-time authentication, no authentication, or the like, as discussed further herein. In response to re-authenticating the platform credential, the system may generate custody control data.

In response to a re-authentication failing, the payload platform may disable one or more components of the payload platform, as previously discussed. In response to failing the re-authentication of the platform credential, the system may generate custody control data.

In various embodiments, the payload platform may perform a system analysis (e.g., as described in step 810, with brief reference to FIG. 8) in response to authenticating the platform credentials and/or receiving the authentication response from the authorization system. The system analysis may also be performed based on the platform credential (e.g., the platform profile associated with the platform credential requires a system analysis). The system analysis may be performed using any suitable process. For example, a system analysis control may be retrieved or determined based on the platform profile matching the platform credentials. The payload platform may perform the system analysis control, as discussed further herein. In various embodiments, the system may generate custody control data responsive to performing the system analysis.

In various embodiments, the payload platform may enable (or disable) payload platform components based on the system analysis. For example, the payload platform may grant at least partial access to a payload platform in response to successfully performing the system analysis. For example, the payload platform may grant access to one or more payload platform accessories, access to operate or fly a payload platform, or the like. Granting at least partial access to the payload platform may be based on the platform profile matching the platform credentials (e.g., based on the authorization controls). The payload platform may enable one or more components to enable the at least partial access. In various embodiments, the system may generate custody control data responsive to enabling payload platform components. As a further example, in response to a failed system analysis (or repeated failed system analyses) the payload platform may disable one or more, or all, components of a payload platform, as discussed further herein. In various embodiments, the system may generate custody control data responsive to disabling payload platform components.

In various embodiments, the system may determine a platform permission based on the platform credential (step 908). Accountability control system 100 and/or authorization system 150 may be configured to determine the platform permission. For example, the system may determine the platform permission from the platform profile matching the platform credential. In various embodiments, the system may generate custody control data responsive to determining the platform permission.

In various embodiments, the system may transmit a permission response (step 910). Accountability control system 100 and/or authorization system 150 may be configured to transmit the permission response to payload platform 110. The permission response may be generated by the authorization system to comprise the platform permission. In various embodiments, the system may generate custody control data responsive to transmitting the permission response.

In various embodiments, in response to receiving the permission response, the payload platform may enable (or disable) payload platform components. The payload platform may enable components of payload platform that are authorized by the platform permission. The payload platform may disable (or not enable) components of payload platform that are not authorized by the platform permission. For example, in response to an accessory access permission of the platform permission granting access to a flashlight accessory but disabling access to a camera accessory, the payload platform may enable one or more components of the payload platform necessary for the flashlight accessory to function while disabling (or not enabling) one or more components of the payload platform necessary for the camera accessory. As a further example, in response to a platform permission comprising an operate permission but not a payload deployment permission, the payload platform may enable one or more components of the payload platform necessary to operate the payload platform while disabling (or not enabling) one or more components of the payload platform necessary to deploy (or cause deployment of) the payload of a payload platform. In various embodiments, the system may generate custody control data responsive to enabling or disabling components of the payload platform based on the permission response.

In various embodiments, the system may request a remote operator (step 912). Accountability control system 100, payload platform 110, and/or authorization system 150 may be configured to request the remote operator from remote control system 290. The system may request a remote operator based on an input from a user, system, device, or the like received by the payload platform. The system may request a remote operator based on a platform permission (e.g., a platform permission requiring a remote operator for one or more features or components of the payload platform). The system may request a remote operator using any process. For example, the system may request a remote operator based on the process disclosed in method 1001, with brief reference to FIG. 10 (and as discussed further herein). In various embodiments, the system may generate custody control data responsive to requesting a remote operator.

In various embodiments, the system may receive payload platform custody control data (step 914). Accountability control system 100 and/or authorization system 150 may be configured to receive the payload platform custody control data. For example, in response to the system enabling (or disabling) payload platform components, the user, system, device or like may operate the payload platform. For example, the user, system, device, or the like may operate accessories of the payload platform, operate or fly the payload platform if the payload platform comprises a remote vehicle, deploy payloads from the payload platform, deploy projectiles and/or payloads from the payload platform, and/ or the like (collectively, payload platform operations). In various embodiments, the payload platform may generate custody control data responsive to one or more of the payload platform operations.

In response to a user, system, device, or the like completing operations of the payload platform (e.g., by powering off the payload platform, by redocking the payload platform, by logging out of the payload platform, etc.), the payload platform may finalize the payload platform custody control data (e.g., custody control data generated by the payload platform during method 901). Finalizing the payload platform custody control data may include generating a data packet comprising all of the custody control data generated by the payload platform. The payload platform may transmit the payload platform custody control data to authorization system 150.

In various embodiments, the system may finalize the custody control data (step 916). Accountability control system 100 and/or authorization system 150 may be configured to finalize the custody control data. For example, in response to receiving the payload platform custody control data, the authorization system may finalize the custody control data. Finalizing the custody control data may include generating a data packet comprising all of the custody control data generated during method 901, including the custody control data generated by the payload platform, the authorization system, the remote control system, and/or any other device or system. In various embodiments, the authorization system may store the finalized custody control data (e.g., in memory of authorization system 150, an evidence management system, etc.).

Figure 10:
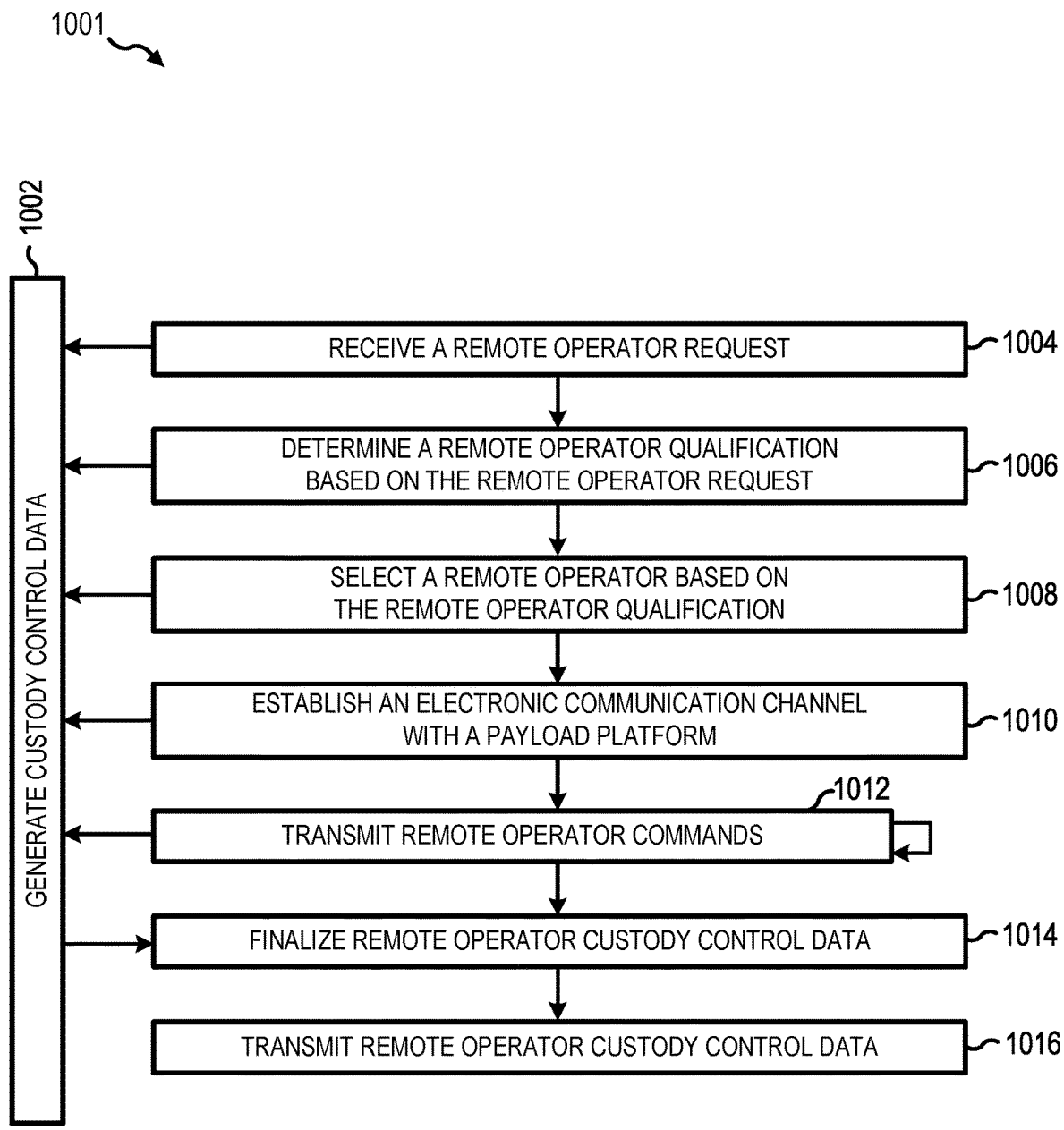
FIG. 10 illustrates a process flow for a method of providing remote operation on a payload platform, in accordance with various embodiments.
Figure 11:
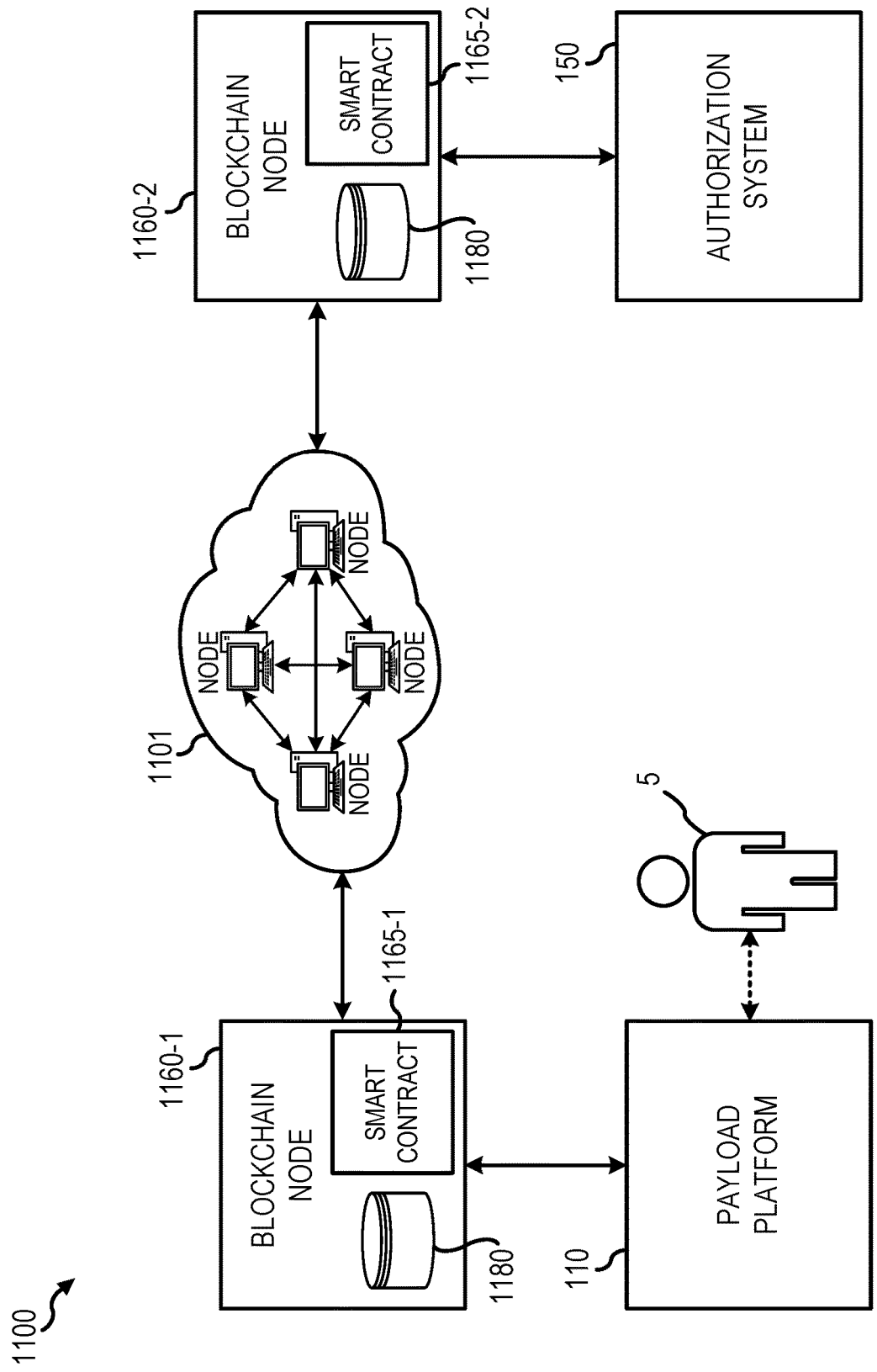
FIG. 11 is a block diagram illustrating system components of an accountability control system implemented using a distributed ledger, in accordance with various embodiments.

In various embodiments, and with specific reference to FIG. 10, a method 1001 for providing remote operation on a payload platform is disclosed. For example, a remote operator or remote control system may be configured to remotely operate payload a platform, access or operate accessories or other components of a payload platform, deploy payloads from a payload platform, and/or perform any other capable remote operations, as discussed further herein.

In various embodiments, one or more of the steps of method 1001 may cause a system to generate custody control data (step 1002). For example, any system or device of an accountability control system may generate the custody control data including payload platform 110, authorization system 150, and/or remote control system 290. The custody control data may be generated based on one or more custody controls. The custody controls may comprise one or more controls configured to capture and record a chain of custody of events (e.g., processes, operations, commands, states, controls, etc.). For example, custody control be configured to record, or cause recordation of, data for each input, action, event, deployment, etc. in the accountability control system.

The custody control data may be generated to include a timestamp. The timestamp may include any information (e.g., date, time, etc.) and may be generated using any suitable process, as disclosed herein. The custody control data may also be generated to comprise one or more correlation data correlating the user, device, or system responsible for the input, action, event, deployment, etc. The correlation data may include an identifier of the user, device, or system, such as, for example, a user identifier, a platform identifier, a system identifier, a MAC address, and IP address, or the like. The custody control data may also comprise any other data helpful or needed to record a chain of custody of events in the system.

In various embodiments, the system may receive a remote operator request (step 1004). Accountability control system 100 and/or remote control system 290 may be configured to receive the remote operator request. The remote operator request may be transmitted by a payload platform, an authorization system, and/or any other device or system of an accountability control system (e.g., as discussed in method 801 and method 901, with brief reference to FIGS. 8 and 9, respectively). The remote operator request may comprise data identifying the payload platform to be remotely accessed (e.g., payload platform identifier), a remote operation to be performed, and/or any other related data. In various embodiments, the system may generate custody control data responsive to receiving the remote operator request.

In various embodiments, the system may determine a remote operator qualification based on the remote operator request (step 1006). Accountability control system 100 and/or remote control system 290 may be configured to determine the remote operator qualification. For example, the remote operator qualification may be determined based on the remote operation to be performed defined in the remote operator request. As a further example, the remote operator qualification may be determined based on data from the remote operator request. In various embodiments, the system may generate custody control data responsive to determining the remote operator qualification.

In various embodiments, the system may select a remote operator based on the remote operator qualification (step 1008). Accountability control system 100 and/or remote control system 290 may be configured to select the remote operator. As an example, in some embodiments performing one or more remote operations may require a skill or qualification. In that regard, a remote operator qualified to remotely operate and fly a payload platform having a remote vehicle may have a different qualification than a remote operator qualified to confirm a target, deploy a payload or projectiles from a payload, operate an accessory of a payload platform, or the like. In various embodiments, a remote operator may be assigned platform permissions similar to a user of a payload platform. The platform permissions (e.g., remote operator platform permissions) may similarly define operations that the remote operator is authorized to perform in the system. In various embodiments, the system may generate custody control data responsive to selecting a remote operator.

In various embodiments, the system may establish an electronic communication channel with a payload platform (step 1010). Accountability control system 100 and/or remote control system 290 may be configured to establish the electronic communication channel. The electronic communication channel may enable communications between the remote control system and the payload platform, such as remote operator commands. The system may establish a secure electronic communication channel with via a network (e.g., network 101). The secure electronic communication channel may be established using any suitable process or technology. For example, the system may establish a virtual private network (VPN) extending across the network and accessible by the remote control system and the payload platform. In various embodiments, the system may generate custody control data responsive to step 1010.

In various embodiments, the electronic communication channel may also comprise intermediary devices or systems between the system and the payload platform.

In various embodiments, the system may transmit one or more remote operator commands (step 1012). Accountability control system 100 and/or remote control system 290 may be configured to transmit one or more remote operator commands (or enable communications) to the payload platform. For example, the system may enable electronic communications between the payload platform and the remote operator (via the remote control system) using the electronic communication channel. In that regard, the remote control system may transmit remote operator commands to control operation of the payload platform based on the remote operations specified and requested in the remote operator request. Similarly, the payload platform may communicate back to the remote control system. A user may transmit inputs via the payload platform to communicate with the remote operator. For example, the user may request a target (e.g., manually, verbally, by laser pointer, etc.) for the payload platform to be deployed towards, provide contextual information, and/or the like. In various embodiments, the system may generate custody control data responsive to the one or more remote operator commands.

In various embodiments, the system may finalize the remote operator custody control data (step 1014). Accountability control system 100 and/or remote control system 290 may be configured to finalize the remote operator custody control data (e.g., custody control data generated by the remote control system during method 1001). Finalizing the remote operator custody control data may include generating a data packet comprising all of the custody control data generated by the remote control system.

In various embodiments, the system may transmit the remote operator custody control data (step 1016). For example, the remote control system may transmit the remote operator custody control data to a payload platform and/or an authorization system. In response to receiving the remote operator custody control data, the payload platform and/or the authorization system may finalize the custody control data. Finalizing the custody control data may include generating a data packet comprising all of the custody control data generated during operation of the payload platform, including the custody control data generated by the payload platform, the authorization system, the remote control system, and/or any other device or system. In various embodiments, the payload platform may locally store the finalized custody control data (e.g., in local memory on payload platform 110). In various embodiments, the authorization system may store the finalized custody control data (e.g., in storage on authorization system 150, an evidence management system, etc.).

In various embodiments, an accountability control system may be implemented using distributed ledger technology. For example, and with reference to FIG. 11, a system 1100 (e.g., an accountability control system) is disclosed. System 1100 may use a distributed ledger maintained by a plurality of computing devices (e.g., nodes) over a peer-to-peer network. Each computing device may maintain a copy and/or partial copy of the distributed ledger and communicate with one or more other computing devices in the peer-to-peer network to validate and write data to the distributed ledger. In various embodiments, the distributed ledger may use features and functionalities of blockchain technology, including, for example, consensus-based validation, immutability, and cryptographically chained blocks of data. The blockchain may comprise a ledger of interconnected blocks containing data. The blockchain may provide enhanced security because each block may hold individual writes and the results of any blockchain executables. Each block may link to the previous block and may include a timestamp. Blocks may be linked by each block including the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on devices, systems, or platforms of system 1100. The applications may communicate with the blockchain (e.g., directly or via a blockchain node) to transmit and retrieve data.

In various embodiments, a governing organization or consortium may control access to data stored on the blockchain. For example, an agency (e.g., security agency, law enforcement agency, private agency, public agency, military, etc.) may control access to data stored on a private blockchain for the agency. Registration with the governing organization or consortium may enable participation in system 1100.

In various embodiments, data transfers performed through system 1100 may propagate to the connected peers within the blockchain network within a duration that may be determined by the block creation time, consensus algorithm implemented, or the like of the specific blockchain technology implemented. Therefore, propagation times and the speed of transferring data in system 1100 may be improved compared to existing or similar systems and implementations. System 110 may also offer increased security at least partially due to the immutable nature of data that is stored in the blockchain, reducing the probability of tampering with various data inputs and outputs. Moreover, system 1100 may also offer increased security of data inputs and outputs by performing cryptographic processes on data prior to storing the data on the blockchain.

In various embodiments, system 1100 may also reduce database synchronization errors by providing a common data structure, thus at least partially improving the integrity of stored data. Further, by syncing data with the involved devices, systems, and platforms in real time (or near real time), system 1100 may improve data integrity, data confidentiality, and data security, which may also improve the immutability of a generated chain of custody. System 1100 may also improve the integrity of stored data as each node broadcasts messages to all connected peers, and, as each block comprises a link to a previous block, a node may quickly detect a missing block and propagate a request for the missing block to the other nodes in the blockchain network.

System 1100 may also offer increased reliability and fault tolerance over traditional databases (e.g., relational databases, distributed databases, etc.) as each node may operate with a full copy of the stored data, thus at least partially reducing downtime due to localized network outages and hardware failures. In the context of a payload platform comprising a plurality of devices communicating over short-range communications, reducing the downtime may also function to improve the availability of the payload platform and the accountability controls disclosed herein. In the context of a payload platform that relies wholly or in part on remote performance or administration of an accountability control (e.g., authorization server), reducing the downtime may also function to improve the end-to-end process to ensure a payload platform is available and accurately authenticated and authorized when needed.

In various embodiments, each node maintaining a full or partial copy of the blockchain may also serve to improve processing times of administering and performing accountability controls.

In various embodiments, system 1100 may include a blockchain network 701. Blockchain network 1101 may be similar to, or comprise similar components with, any other network discussed herein, including network 101 (with brief reference to FIGS. 1 and 2). Blockchain network 1101 may be a blockchain network or peer-to-peer network that is private, consortium (e.g., federated or consortium), and/or public in nature. Consortium and private networks may offer improved control over the content of the blockchain and public networks may leverage the cumulative computing power of the network to improve security.

Blockchain network 1101 may comprise a plurality of blockchain nodes configured to maintain a blockchain 1180 and consent to writes to blockchain 1180. For example, blockchain network 1101 may comprise a first blockchain node 1160-1 (e.g., a payload platform blockchain node), a second blockchain node 1160-2 (e.g., an authorization system blockchain node), and/or one or more other blockchain nodes dependent on other systems and devices in system 1100.

In various embodiments, first blockchain node 1160-1 may be in electronic communication with payload platform 110. Payload platform 110 may access and/or interact with first blockchain node 1160-1 and/or blockchain 1180 via an API (e.g., a web3 API compatible with the blockchain maintained by the ETHEREUM® consortium, etc.) or the like. In various embodiments, first blockchain node 1160-1 may be integrated within or into payload platform 110, or a device or component of payload platform 110.

First blockchain node 1160-1 may comprise a computing device, computer-based system, server, or the like. First blockchain node 1160-1 may comprise one or more hardware and/or software components. For example, first blockchain node 1160-1 may comprise a processing unit, a communications unit, a memory, and/or the like. First blockchain node 1160-1 may be configured to check if a block is valid and accept or reject it, write blocks on a local copy of blockchain 1180, broadcast the write to other blockchain nodes in blockchain network 1101, establish consensus on writes to blockchain 1180, and/or perform any other related operation.

In various embodiments, second blockchain node 1160-2 may be in electronic communication with authorization system 150. Payload platform 110 may access and/or interact with second blockchain node 1160-2 and/or blockchain 1180 via an API (e.g., a web3 API compatible with the blockchain maintained by the ETHEREUM® consortium, etc.) or the like. In various embodiments, second blockchain node 1160-2 may be integrated within or into authorization system 150, or as a device or component of authorization system 150.

Second blockchain node 1160-2 may comprise a computing device, computer-based system, server, or the like. Second blockchain node 1160-2 may comprise one or more hardware and/or software components. For example, second blockchain node 1160-2 may comprise a processing unit, a communications unit, a memory, and/or the like. Second blockchain node 1160-2 may be configured to check if a block is valid and accept or reject it, write blocks on a local copy of blockchain 1180, broadcast the write to other blockchain nodes in blockchain network 1101, establish consensus on writes to blockchain 1180, and/or perform any other related operation.

Blockchain 1180 may be a distributed ledger that maintains records in a readable manner and that is resistant to tampering. Blockchain 1180 may be based on any suitable or desirable blockchain technology. Blockchain 1180 may comprise a ledger of interconnected blocks containing data. Each block may link to the previous block and may include a timestamp. When implemented in support of system 1100, blockchain 1180 may serve as an immutable log of platform profiles, accountability controls, custody control data, and/or the like. Blockchain 1180 may be maintained on various blockchain nodes in the form of copies or partial copies of blockchain 1180, as discussed further herein. Blocks may be written to blockchain 1180 by establishing consensus between the blockchain nodes. For example, consensus may be established based on proof of work, proof of stake, practical byzantine fault tolerance, delegated proof of stake, proof of elapsed time, proof of authority, or other suitable consensus algorithms.

In various embodiments, blockchain network 1101 may host and/or implement one or more smart contracts. The smart contracts may control the end-to-end data flow, provision of accountability controls, and/or the like in system 1100.

For example, and in accordance with various embodiments, blockchain network 1110 may host one or more smart contracts 1165 (e.g., first smart contract 1165-1, second smart contract 1165-2). Smart contracts 1165 may comprise executables that write data to blockchain 1180 in a predetermined format based on predetermined function parameters passed by an API call (e.g., from payload platform 110 or authorization system 150) or the like, as discussed further herein. Smart contracts 1165 may also be configured to execute (or cause execution of) programs and instructions to enforce accountability controls, including, for example, the provision of authentication controls, authorization controls, and/or custody controls. Smart contracts 1165 may include programs written in a programming language such as, for example, Solidity, or any other suitable smart contract programming language.

In various embodiments, each blockchain node 1160 may host a smart contract 1165 that autonomously governs provision of accountability controls, transmission of data between systems and device of system 1100, and/or writing of data to blockchain 1180. Each smart contract 1165 may also be configured to store and maintain a stored data map comprising stored platform profiles, platform credentials, platform permissions, or the like, or metadata indicating the position of stored platform profiles, platform credentials, platform permissions, or the like in blockchain 1180. In various embodiments, smart contract 1165 may be configured to store and maintain the stored platform profiles, platform credentials, platform permissions, or the like, together with the stored data map.

In various embodiments, a smart contract 1165 may be configured to execute or perform one or more steps of methods 701, 801, 901, and 1001. For example, with brief reference to FIG. 7, a smart contract 1165 (e.g., first smart contract 1165-1, second smart contract 1165-2, etc.) may be invoked or executed to perform one or more steps of method 701, including, for example, receive step 702, define step 706 (and/or one or more of steps 706-1, 706-2, and 706-3), generate step 708, transmit step 710, and/or any other step of method 701. For example, with brief reference to FIG. 8, a smart contract 1165 (e.g., first smart contract 1165-1, second smart contract 1165-2, etc.) may be invoked or executed to perform one or more steps of method 801, including, for example, generating step 802, receiving step 804, verifying step 806, authenticating step 808, capturing step 818, finalizing step 820, and/or any other step of method 801. For example, with brief reference to FIG. 9, a smart contract 1165 (e.g., first smart contract 1165-1, second smart contract 1165-2, etc.) may be invoked or executed to perform one or more steps of method 901, including, for example, generate step 902, receive step 904, authenticate step 906, determine step 908, transmit step 910, receive step 914, finalize step 916, and/or any other step of method 901. For example, with brief reference to FIG. 10, a smart contract may be invoked or executed to perform one or more steps of method 1001, including, for example, generate step 1002, receive step 1004, determine step 1006, finalize step 1014, transmit step 1016, and/or any other step of method 1001.

In various embodiments, in response to executing or performing any of the one or more method steps of the above, after completion of all steps, or at any other desired or defined time or step, a smart contract 1165 may write the data to a local copy of blockchain 1180. Smart contract 1165, via the blockchain node 1160, may propagate the write to at least a second blockchain node in blockchain network 1101 for writing to blockchain 1180. One or more blockchain nodes in blockchain network 1101, including the second blockchain node, may consent to the write using any suitable consensus method. In some embodiments, the blockchain write may be signed with a digital certificate corresponding to the blockchain node 1160, platform (e.g., payload platform 110), system (e.g., authorization system 150), and/or the like initiating the write.

In various embodiments, a method for registering an entity with an accountability control system may be completed by a blockchain node, an API in electronic communication with the blockchain node, and/or a smart contract configured to perform operations on the blockchain node. The method may include one or more steps such as: receiving a registration request comprising registration data; verifying the registration data; defining an accountability control; generating a platform profile comprising the accountability control and/or based on the registration request; writing the platform profile to a local copy of a blockchain; and propagating a proposal to consensus participants for writing to the blockchain, wherein the proposal comprises the platform profile. In some embodiments, propagating the proposal may include distributing the proposal to at least a second blockchain node in a same blockchain network for writing to the blockchain. In some embodiments, the method may also include receiving a confirmation from the at least the second blockchain node of the write to the blockchain.

In various embodiments, a method for providing an accountability control on a payload platform may be completed by a blockchain node, an API in electronic communication with the blockchain node, and/or a smart contract configured to perform operations on the blockchain node. The blockchain node may be the payload platform, a blockchain node separate from or in communication with the payload platform, and/or the like. The method may include one or more steps such as: receiving a platform credential; authenticating and/or verifying the platform credential; performing a system analysis; determining a platform permission; enabling and/or disabling payload platform components based on the platform permission; capturing payload platform operational data based on use and/or operation of the payload platform; generating custody control data based on at least one of the receiving, the authenticating and/or verifying, the performing, the determining, the enabling and/or disabling, and/or the capturing; writing the custody control data to a local copy of a blockchain; and propagating a proposal to consensus participants for writing to the blockchain, wherein the proposal comprises the custody control data. In some embodiments, propagating the proposal may include distributing the proposal to at least a second blockchain node in a same blockchain network for writing to the blockchain. In some embodiments, the method may also include receiving a confirmation from the at least the second blockchain node of the write to the blockchain.

In various embodiments, a method for providing an accountability control on a payload platform via a remote system may be completed by a blockchain node, an API in electronic communication with the remote system, and/or a smart contract configured to perform operations on the remote system. The blockchain node may be the remote system, a blockchain node separate from or in communication with the remote system, and/or the like. The payload platform may comprise or be in communication with a separate blockchain node. The method may include one or more steps such as: receiving a platform credential (directly or from the payload platform); authenticating and/or verifying the platform credential; determining a platform permission; transmitting a permission response to the payload platform; generating custody control data based on at least one of the receiving, the authenticating and/or verifying, and/or the transmitting; writing the custody control data to a local copy of a blockchain; and propagating a proposal to consensus participants for writing to the blockchain, wherein the proposal comprises the custody control data. In some embodiments, the transmitting step may comprise writing and propagating the permission response to the blockchain so that the payload platform can retrieve the permission response from the blockchain. In some embodiments, the method may include receiving payload platform custody control data from the payload platform (directly or as a propagated write to the blockchain). In that respect, the custody control data written and propagated to the blockchain may also include the payload platform custody control data and/or custody control data regarding the receiving the payload platform custody control data. In some embodiments, propagating the proposal may include distributing the proposal to at least a second blockchain node in a same blockchain network for writing to the blockchain. In some embodiments, the method may also include receiving a confirmation from the at least the second blockchain node of the write to the blockchain.

Figure 12:
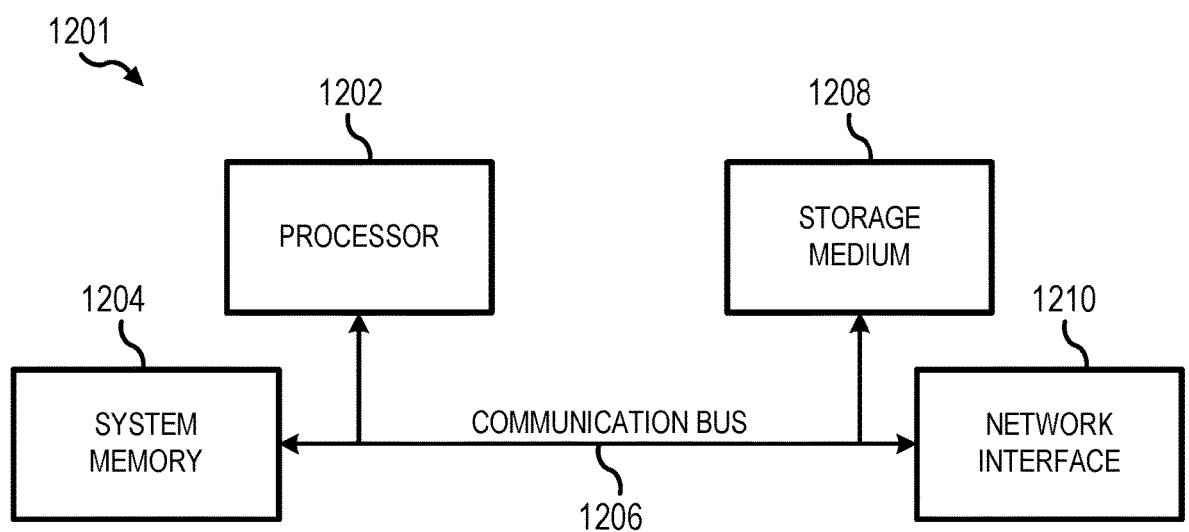
FIG. 12 is a block diagram illustrating components of a computer-based system, in accordance with various embodiments.

In various embodiments, and with reference to FIG. 12, an exemplary computer-based system 1201 is disclosed. Computer-based system 1201 may be appropriate for use in accordance with embodiments of the present disclosure. The accompanying description of computer-based system 1201 may be applicable to servers, personal computers, mobile phones, smart phones, tablet computers, embedded computing devices, and other currently available or yet-to-be-developed devices that may be used in accordance with embodiments of the present disclosure.

Computer-based system 1201 may include a processor 1202 and a system memory 1204 connected by a communication bus 1206. Depending on the exact configuration and type of computer-based system, system memory 1204 may be volatile or nonvolatile memory, such as read only memory ("ROM"), random access memory ("RAM"), EEPROM, flash memory, or other memory technology. Those of ordinary skill in the art and others will recognize that system memory 1204 typically stores data and/or program modules that are immediately accessible to and/or currently being operated on by processor 1202. In this regard, processor 1202 may serve as a computational center of computer-based system 1201 by supporting the execution of instructions. Processor 1202 may comprise one or more processing units, as discussed further herein. System memory 1204 may comprise one or more memory units, as discussed further herein.

Computer-based system 1201 may include a network interface 1210 comprising one or more components for communicating with other devices and systems over a network. Embodiments of the present disclosure may access basic services that utilize network interface 1210 to perform communications using common network protocols. Network interface 1210 may comprise a communications unit, as discussed further herein.

Computer-based system 1201 may also include a storage medium 1208. However, services may be accessed using a computer-based system that does not include means for persisting data to a local storage medium. Therefore, storage medium 1208 depicted in FIG. 12 is optional. Storage medium 1208 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 1208 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 1204 and storage medium 1208 depicted in FIG. 12 are examples of computer-readable media.

For ease of illustration and because it is not important for an understanding of the claimed subject matter, FIG. 12 does not show some of the typical components of many computer-based systems. In this regard, computer-based system 1201 may include input devices, such as a keyboard, keypad, mouse, trackball, microphone, video camera, touchpad, touchscreen, electronic pen, stylus, and/or any other input device described herein. Such input devices may be coupled to computer-based system 1201 by wired or wireless connections including RF, infrared, serial, parallel, BLUETOOTH®, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computer-based system 1201 (e.g., a client device), or can be integral components of computer-based system 1201. In some embodiments, multiple input devices may be combined into a single, multifunction input device (e.g., a video camera with an integrated microphone).

Computer-based system 1201 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computer-based system 1201, or can be integral components of computer-based system 1201. Input functionality and output functionality may be integrated into the same input/output device (e.g., a touchscreen). Any suitable input device, output device, or combined input/output device either currently known or developed in the future may be used with described systems.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory" or "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein may include relational, hierarchical, graphical, distributed ledger, blockchain, object-oriented structure, and/or any other database configurations, unless otherwise specified. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A payload platform comprising:
   a platform;
   a payload configured to be deployed from the platform;
   a processor; and
   a tangible, non-transitory memory configured to communicate with the processor, the tangible, non-transitory memory having instructions stored thereon that, in response to execution by the processor, cause the processor to perform operations comprising:
      receiving a platform credential;
      authenticating the platform credential based on an accountability control;
      determining a platform permission based on the platform credential and the accountability control, wherein the platform permission comprises an access permission and a separate at least one of an operate permission or a payload deployment permission; and
      enabling at least one component of the platform or the payload based on the platform permission.

2. The payload platform of claim 1, wherein the accountability control comprises an authentication control, and wherein the authentication control comprises at least one of an authentication type or an authentication continuum.

3. The payload platform of claim 2, wherein the processor performs operations further comprising reauthenticating the platform credential based on the authentication continuum.

4. The payload platform of claim 1, wherein the platform permission further comprises a remote operator requirement.

5. The payload platform of claim 1, wherein the payload deployment permission comprises at least one of a number of payloads, a number of projectiles, or a provision of a stimulus signal.

6. The payload platform of claim 1, wherein the accountability control comprises a security analysis control, and wherein the security analysis control comprises at least one of a device fingerprint control or a component compatibility control.

7. The payload platform of claim 6, wherein the processor performs operations further comprising performing a security analysis of at least one of the platform or the payload based on the security analysis control.

8. The payload platform of claim 1, wherein the processor performs operations further comprising generating custody control data in response to at least one of the receiving, the authenticating, the determining, or the enabling.

9. The payload platform of claim 1, further comprising a platform accessory, wherein the platform accessory comprises at least one of a recording device, an audio output component, an aiming apparatus, or a light-emitting component, and wherein the platform permission further comprises an accessory access permission controlling user operation of the platform accessory.

10. The payload platform of claim 1, wherein the platform credential comprises a physical authentication key, and wherein the physical authentical key is configured to be inserted into or removed from the payload platform.

11. An authorization system comprising:
    a processor; and
    a tangible, non-transitory memory configured to communicate with the processor, the tangible, non-transitory memory having instructions stored thereon that, in response to execution by the processor, cause the processor to perform operations comprising:
       receiving, from a payload platform, a platform credential;
       determining a platform permission based on the platform credential, wherein the platform permission comprises an access permission and a separate at least one of an operate permission or a payload deployment permission; and
       transmitting, to the payload platform, a permission response comprising the platform permission, wherein in response to the payload platform receiving the permission response, the payload platform is configured to enable or disable a component of the payload platform based on the platform permission.

12. The authorization system of claim 11, wherein the processor performs operations further comprising capturing custody control data in response to at least one of the receiving, the determining, or the transmitting.

13. The authorization system of claim 11, wherein the platform permission further comprises a remote operator requirement, and wherein the processor performs operations further comprising transmitting a remote operator request to a remote control system based on the platform permission.

14. The authorization system of claim 11, wherein the platform permission further comprises at least one of an accessory access permission or a remote operator requirement.

15. The authorization system of claim 11, wherein the payload deployment permission comprises at least one of a number of payloads, a number of projectiles, or a provision of a stimulus signal.

16. A method for providing an accountability control to a payload platform, comprising:
    receiving a platform credential;
    authenticating the platform credential based on the accountability control;
    determining a platform permission based on the platform credential and the accountability control, wherein the platform permission comprises an access permission and a separate at least one of an operate permission or a payload deployment permission;
    at least one of enabling or disabling a component of the payload platform based on the platform permission; and
    capturing custody control data based on the accountability control, wherein the custody control data is captured in response to at least one of the receiving, the authenticating, the determining, or the enabling.

17. The method of claim 16, wherein the accountability control comprises a security analysis control, and further comprising performing a security analysis of the payload platform based on the security analysis control.

18. The method of claim 17, wherein the performing the security analysis comprises determining whether a component of the payload platform is compromised.

19. The method of claim 17, wherein the performing the security analysis comprises generating a device fingerprint of at least one component of the payload platform.

20. The method of claim 19, wherein the performing the security analysis further comprises comparing the device fingerprint to a previously generated device fingerprint.

* * * * *